(12) United States Patent
Stone et al.

(10) Patent No.: US 11,254,074 B2
(45) Date of Patent: Feb. 22, 2022

(54) APPARATUS AND METHOD FOR MAKING RADIUS COMPOSITE GAP FILLER

(71) Applicant: THE BOEING COMPANY, Chicago, IL (US)

(72) Inventors: Paul Reed Stone, Provo, UT (US); Cody S. Conant, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 335 days.

(21) Appl. No.: 16/445,537

(22) Filed: Jun. 19, 2019

(65) Prior Publication Data
US 2020/0398506 A1    Dec. 24, 2020

(51) Int. Cl.
| | |
|---|---|
| B29C 70/52 | (2006.01) |
| B29D 99/00 | (2010.01) |
| B29C 43/46 | (2006.01) |
| B29C 43/22 | (2006.01) |
| B29C 70/50 | (2006.01) |
| B29L 31/30 | (2006.01) |

(52) U.S. Cl.
CPC .......... B29C 70/526 (2013.01); B29C 43/224 (2013.01); B29C 43/46 (2013.01); B29C 70/504 (2013.01); B29D 99/0005 (2021.05); B29D 99/0007 (2013.01); *B29C 2043/467* (2013.01); *B29L 2031/3076* (2013.01)

(58) Field of Classification Search
CPC ........ B29C 2043/466; B29C 2043/467; B29C 70/526; B29D 99/0005
See application file for complete search history.

(56) References Cited

U.S. PATENT DOCUMENTS

| | | | | |
|---|---|---|---|---|
| 3,518,157 A | * | 6/1970 | Hahn | B29C 67/249 |
| | | | | 524/492 |
| 4,559,005 A | * | 12/1985 | Gants | B29D 99/0005 |
| | | | | 425/363 |
| 4,950,151 A | * | 8/1990 | Zachariades | B29C 55/18 |
| | | | | 425/379.1 |

(Continued)

FOREIGN PATENT DOCUMENTS

| | | | |
|---|---|---|---|
| CN | 108312578 A | 7/2018 | |
| DE | 102007048792 A1 | * 4/2009 | ........... A63B 51/026 |
| JP | 04299110 A | * 10/1992 | ............. B29C 43/46 |

OTHER PUBLICATIONS

Communication Pursuant to Rule 62 EPC for EP Application No. 20172766.6 dated Oct. 28, 2020.

*Primary Examiner* — Benjamin A Schiffman
(74) *Attorney, Agent, or Firm* — Marshall, Gerstein & Borun LLP

(57) ABSTRACT

A die assembly for forming a composite gap filler, including a first die having a first portion which extends along a first central axis of the first die and has a first curved surface which has a radius which changes as the first curved surface extends about the first central axis. A second die a second portion which extends along a second central axis of the second die and has a second curved surface which has a radius which changes as the second curved surface extends about the second central axis. A third die defines a third wall member which extends about the third die and which changes in width dimension wherein with the first die abutting the second die and with the third wall member abutting the first and second dies, a closed gap is formed.

20 Claims, 13 Drawing Sheets

(56) References Cited

U.S. PATENT DOCUMENTS

| | | | | |
|---|---|---|---|---|
| 5,820,804 | A | 10/1998 | Elmaleh | |
| 6,264,780 | B1 * | 7/2001 | Iwanaga | B29D 30/48 |
| | | | | 156/136 |
| 7,905,975 | B2 * | 3/2011 | Suzuki | B29B 11/16 |
| | | | | 156/245 |
| 8,591,685 | B2 * | 11/2013 | Anderson | B29C 70/526 |
| | | | | 156/214 |
| 8,940,119 | B2 * | 1/2015 | Hanawa | B29C 70/50 |
| | | | | 156/227 |
| 9,073,272 | B2 * | 7/2015 | Blot | B29C 70/52 |
| 9,114,588 | B2 * | 8/2015 | Oefner | B29D 99/0005 |
| 9,415,577 | B1 * | 8/2016 | Sutkus | B29D 99/0003 |
| 9,475,256 | B2 * | 10/2016 | Thomas | B64C 1/061 |
| 9,855,702 | B1 * | 1/2018 | Olberg | B29C 48/12 |
| 10,232,572 | B2 * | 3/2019 | Thomas | B29D 99/0007 |
| 10,703,053 | B2 * | 7/2020 | Gordon | B29D 99/0003 |
| 10,723,436 | B2 * | 7/2020 | Cheng | B29D 99/0005 |
| 10,875,621 | B2 * | 12/2020 | Stone | B29C 70/388 |
| 11,000,978 | B2 * | 5/2021 | Stone | B29C 43/46 |
| 11,155,049 | B2 * | 10/2021 | Rihei | B29C 70/54 |
| 2010/0024966 | A1 * | 2/2010 | Felip | B29C 67/0003 |
| | | | | 156/196 |
| 2016/0121536 | A1 * | 5/2016 | Derx | B29C 48/2566 |
| | | | | 264/476 |
| 2016/0271890 | A1 * | 9/2016 | Rihei | B29D 99/0005 |
| 2016/0368255 | A1 * | 12/2016 | Witte | B32B 37/0053 |
| 2017/0029577 | A1 * | 2/2017 | Glynn | B29C 70/081 |
| 2019/0160763 | A1 * | 5/2019 | Morishima | B29D 99/0005 |
| 2020/0290297 | A1 * | 9/2020 | Rihei | B29D 99/0005 |

* cited by examiner

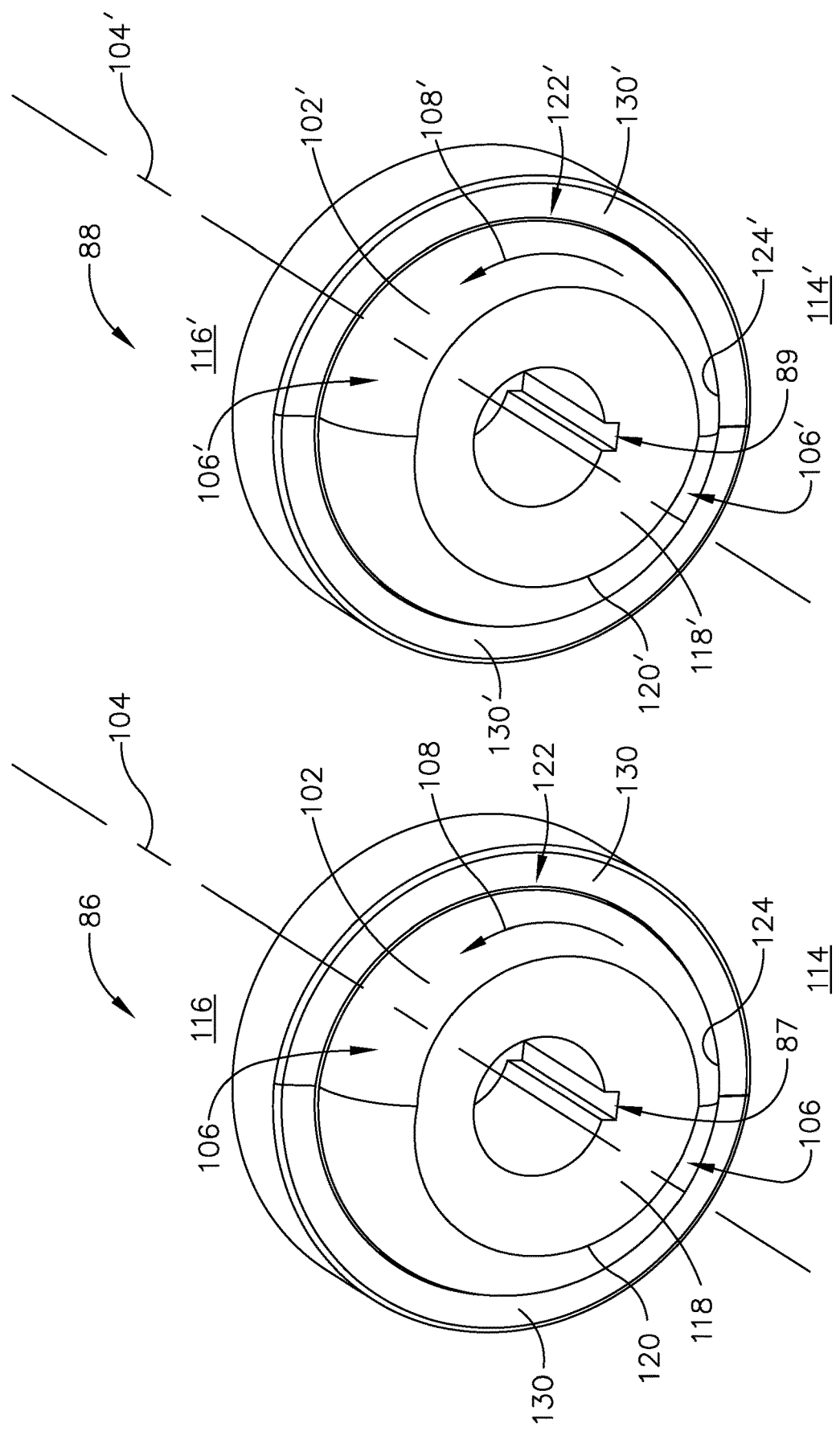

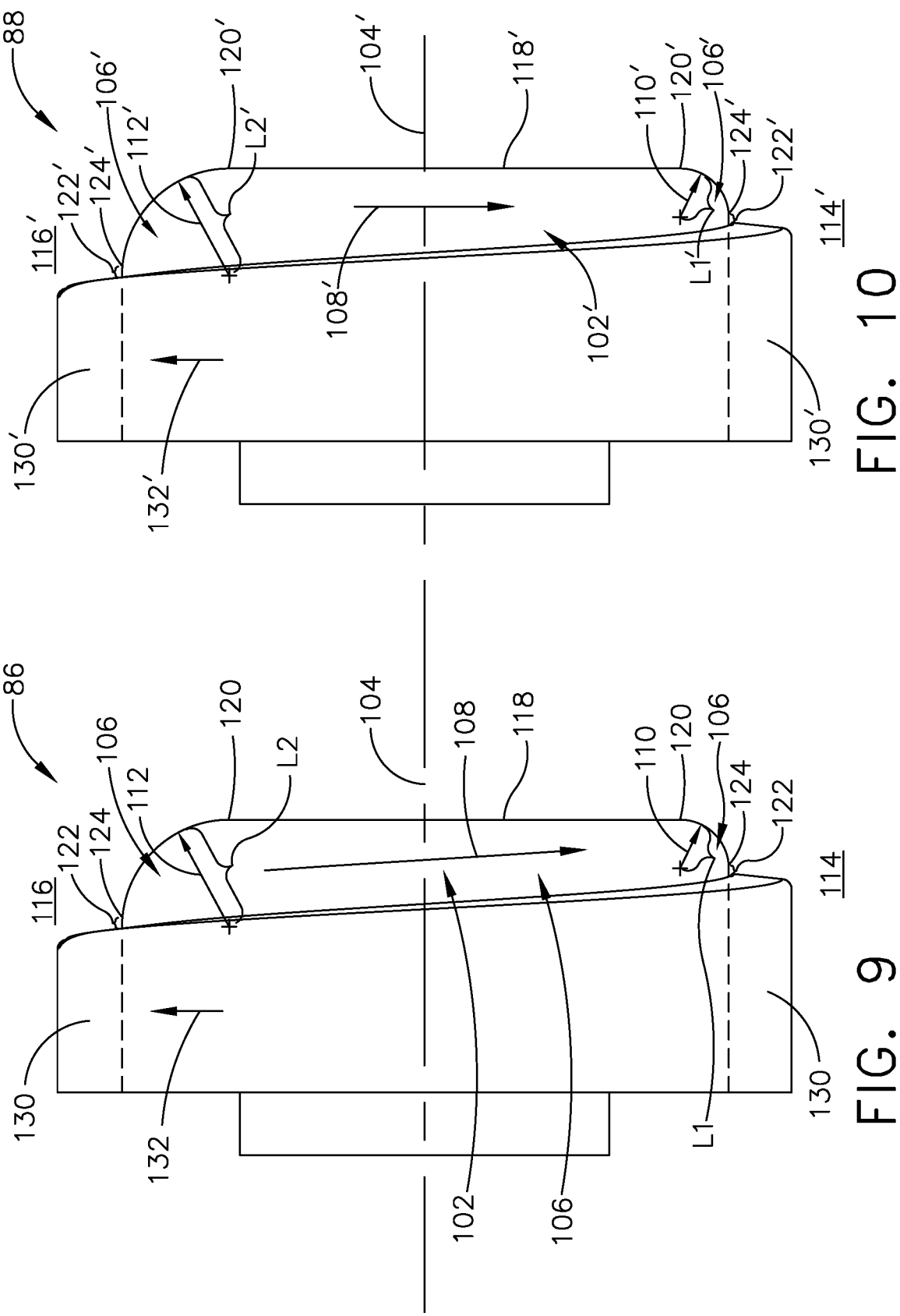

APPARATUS AND METHOD FOR MAKING RADIUS COMPOSITE GAP FILLER

FIELD

This disclosure relates to forming a composite gap filler, and more particularly, to an assembly and method for forming a composite gap filler having adjacent curved sides.

BACKGROUND

Composite gap fillers are used in conjunction with a wide variety of structures. In an example, composite gap fillers are used in association with a stringer used in reinforcing portions of a skin structure of an aircraft. The stringer, in one example, is constructed of pair of c-shaped channels. Each c-shaped channel has a web portion with a flange portion extending from each end of each web portion. The flanges of each web portion extend away from the web portion with a corner formed between each flange and its corresponding web portion with an outer surface of each corner forming a curved surface.

With the web portion of each of the two c-shaped channels positioned in abutting relationship with one another and secured together, a stringer is formed. The flanges of a first end of a stringer are aligned with and extend in opposite directions from one another. On an opposing second end of the stringer the flanges are aligned with and extend in opposite directions from one another. As a result, on the first end of the stringer the outer surface of the corners extending between the flanges and their corresponding web portions form curved surfaces which are positioned adjacent to one another and similarly the outer surfaces of the corners extending between the flanges and their corresponding web portions form curved surfaces on the opposing second end of the stringer are positioned adjacent to another.

With the first end of the stringer positioned against a skin, the two adjacent curved surfaces associated with the first end of the stringer and the skin form a gap, wherein the gap extends along the length of the first end of the stringer. With the opposing second end of the stringer having a skin structure positioned in overlying relationship with the opposing second end of the stringer, the two adjacent curved surfaces associated with the opposing second end of the stringer and the cap structure similarly form a gap wherein the gap extends along the length of the opposing second end of the stringer. The gap formed, for example, along the length of the first end of the stringer and along the second end of the stringer each have three sides and three corners wherein two adjacent sides of the gap are curved, as formed by the adjacent corners of the c-shaped channels, and a third side is formed by the skin having a flatter configuration.

A composite gap filler is needed to fill in the gap along the length of the gap and conform to the two curved adjacent sides of the gap and to the flatter configuration bounded by the skin the stringer is reinforcing. The composite gap filler is used to enhance the strength of the stringer, reduce the amount of material needed to construct the stringer and to provide the needed support to the skin structure. The adjacent curved sides of the gap can change in radius of curvature as the gap progresses along the stringer and the dimension of the third side of the gap formed by the skin can also correspondingly change in size as the stringer extends along the skin. Thus, as further strength requirements are needed, an increase in size of the stringer is needed resulting in an increase in the radius of the adjacent sides of the gap and resulting in an increase in the width of the third side of the gap formed by the skin which extends between the adjacent curved sides. The increase in the radius of curvature of the adjacent curved sides and the increase in width of the third side of the gap results in an overall increase in size of the composite gap filler needed to be positioned within that portion of the gap to fill that portion of the gap. As strength demand decreases the radius of curvature of adjacent sides of the gap decreases as defined by the stringer resulting in the decrease in width of the third side of the gap resulting in an overall reduction in size of the gap and a corresponding reduction in size of the composite gap filler needed to be positioned within and fill that portion of the gap.

Difficulties have arisen in forming the composite gap fillers with the two adjacent curved sides changing in radius of curvature and the flatter third side changing correspondingly in width between the two adjacent curved sides, as the composite gap filler extends along the length of the gap filler. For example, where added strength is needed in the construction of a wing, such as at the fuselage location and an engine mount location, the stringer is larger and the resulting gap formed by the stringer and the skin structure of the wing increase in overall size with increased radiuses of curvature of the two adjacent curved sides and increased width of the third side of the gap formed by the skin. As a result, with a larger sized gap a larger sized composite gap filler is needed to fill the gap between the stringer and the skin structure. Where less strength is needed, such as at a distal end of a wing from the fuselage, the stringer size can decrease and the corresponding gap formed between the stringer and the skin structure decreases in size resulting in smaller radiuses of curvature for the two adjacent curved sides of the gap and a shorter width of the third side of the gap formed by the skin structure. As a result, with a smaller sized gap a smaller sized composite gap filler is needed to fill the gap between the stringer and the skin structure.

In use of guillotine dies to form the adjacent curved surfaces of the composite gap filler, it is problematic to fabricate the composite gap filler from a smaller sized composite gap filler to a larger sized composite gap filler. In increasing the dimension of the gap filler, additional tape of composite laminate material is added to the existing gap filler, however the added tape of the composite laminate material is not secured to the existing gap filler material being formed. With the addition of tape there is an increase in fibers within the composite material to be used to form the composite gap filler. With the gap filler material experiencing a tension force being pulled through the rollers forming the gap filler, the added material is not sufficiently secured. As a result, the added fibers tend to be scraped off by the guillotine dies in forming the adjacent sides of the gap filler being increased in size.

In other instances when a radius of curvature to the adjacent two curved surfaces of the composite gap filler needed to be changed, guillotine dies or roller sizes were changed which imparted a different radius of curvature. However, the newly installed roller or die immediately imparted a different radius of curvature to the composite gap filler causing an abrupt change to the surface of the adjacent curved surfaces of the composite gap filler and to the third side of the composite gap filler extending between the adjacent curved sides. There was no transition provided in the surface of the composite gap filler with the changing of the radius of curvature of the composite gap filler. This changing of rollers or dies, for example, took time and resulted in a non-continuous or abrupt surface change on the composite gap filler. This lack of transition in radius change on the composite gap filler did not optimize the fit of the composite gap filler with the gap it was intended to fill with the gap providing smooth transitions of change of radius of curvature of the adjacent sides of the gap. As a result, the performance of the stringer was not optimized.

There has also been use of roller dies that were changed in position such as the plane of the axis of rotation of the roller dies relative to the composite gap filler being fabricated to accommodate changing size and radiuses in the gap to be filled. Even though different sized roller dies were not employed, a change was made in the position of the plane of the axis of rotation of the rollers relative to the gap filler to impart different radiuses and sizes, without a rotation of the axis of rotation of the roller dies about an axis of rotation positioned transverse to the axis of rotation for each roller to provide for a transitional change in the radius of the composite gap filler the roller dies would hinder one another with being in interference with one another.

In other instances, two adjacent curved roller dies were rotated in abutting relationship to one another and each in abutting relationship with a platform. The two rotating roller dies formed the two adjacent curved surfaces of the composite gap filler and the platform formed the third flatter side of the composite gap filler. The two roller dies abutted on curved surfaces of the roller dies and a curved surface of each roller die abutted the platform. As the composite material was pulled through the two rotating roller dies the roller dies disturbed fibers in the composite material and moved the fibers out of the gap between the roller dies and between the roller dies and the platform as the composite gap filler was being formed. Losing fiber content within the composite gap filler being produced reduced the optimization of the performance of the composite gap filler.

There is a need not to have change in configuration of composite gap filler drive stringer size design. There is also a need for providing a composite gap filler fabrication assembly that will reliably form composite gap fillers with smooth transition along the length of the composite gap filler with respect to change of size, radiuses of curvature with respect to the two adjacent curved sides of the composite gap filler and with the change in width of the third side of the composite gap filler without abrupt surface changes imparted to the composite gap filler. There is also a need to produce optimal composite gap filler regardless of whether the composite gap filler is increasing or decreasing in size along the length of the composite gap filler. Furthermore, there is also a need to fabricate composite gap filler so as to not experience a fiber count reduction in the composite gap filler in the fabrication process of the composite gap filler.

SUMMARY

An example includes a die assembly for forming a composite gap filler which includes a first die having a first central axis wherein the first die includes a first portion which extends along the first central axis and has a first curved surface having a radius which changes as the first portion extends about the first central axis. The first die further includes a first planar surface portion which extends from a first end of the first curved surface and a second planar surface portion which extends from a second end of the first curved surface. A second die having a second central axis wherein the second die includes a second portion which extends along the second central axis and has a second curved surface having a radius which changes as the second portion extends about the second central axis. The second die further includes a third planar surface portion which extends from a first end of the second curved surface and a fourth planar surface portion which extends from a second end of the second curved surface. A third die has a third central axis and defines a third wall member which extends about the third central axis and changes in width dimension as the third wall member extends about the third central axis, wherein with the first planar surface portion and the third planar surface portion abutting one another and with the third wall member abutting the second planar surface portion and the fourth planar surface portion, a closed gap is formed.

An example includes a method of forming a composite gap filler including a step of positioning a first die and second die abutting one another and a third die abutting the first die and second die. The first die has a first central axis, the second die has a second central axis and the third die has a third central axis. The first die includes a first portion which extends along the first central axis and has a first curved surface having a radius which changes as the first portion extends about the first central axis. The first die includes a first planar surface portion which extends from a first end of the first curved surface and a second planar surface portion which extends from a second end of the first curved surface. The second die includes a second portion which extends along the second central axis and has a second curved surface having a radius which changes as the second portion extends about the second central axis. The second die includes a third planar surface portion which extends from a first end of the second curved surface and a fourth planar surface portion which extends from a second end of the second curved surface. A third die defines a third wall member which extends about the third central axis and changes in width dimension as the third wall member extends about the third central axis, such that with the first planar surface portion and the third planar surface portion abutting one another and with the second planar surface portion and the fourth planar surface portion abutting the third wall member, a closed gap is formed. The method further includes a step of pulling composite material through the closed gap forming a composite gap filler having a shape of the closed gap.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 7 is a perspective view of a first die of the die assembly of FIG. 3;

FIG. 8 is a perspective view of a second die of the die assembly of FIG. 3;

FIG. 9 is a side elevation view of first die of FIG. 7;

FIG. 10 is a side elevation view of the second die of FIG. 8;

DESCRIPTION

Figure 1:
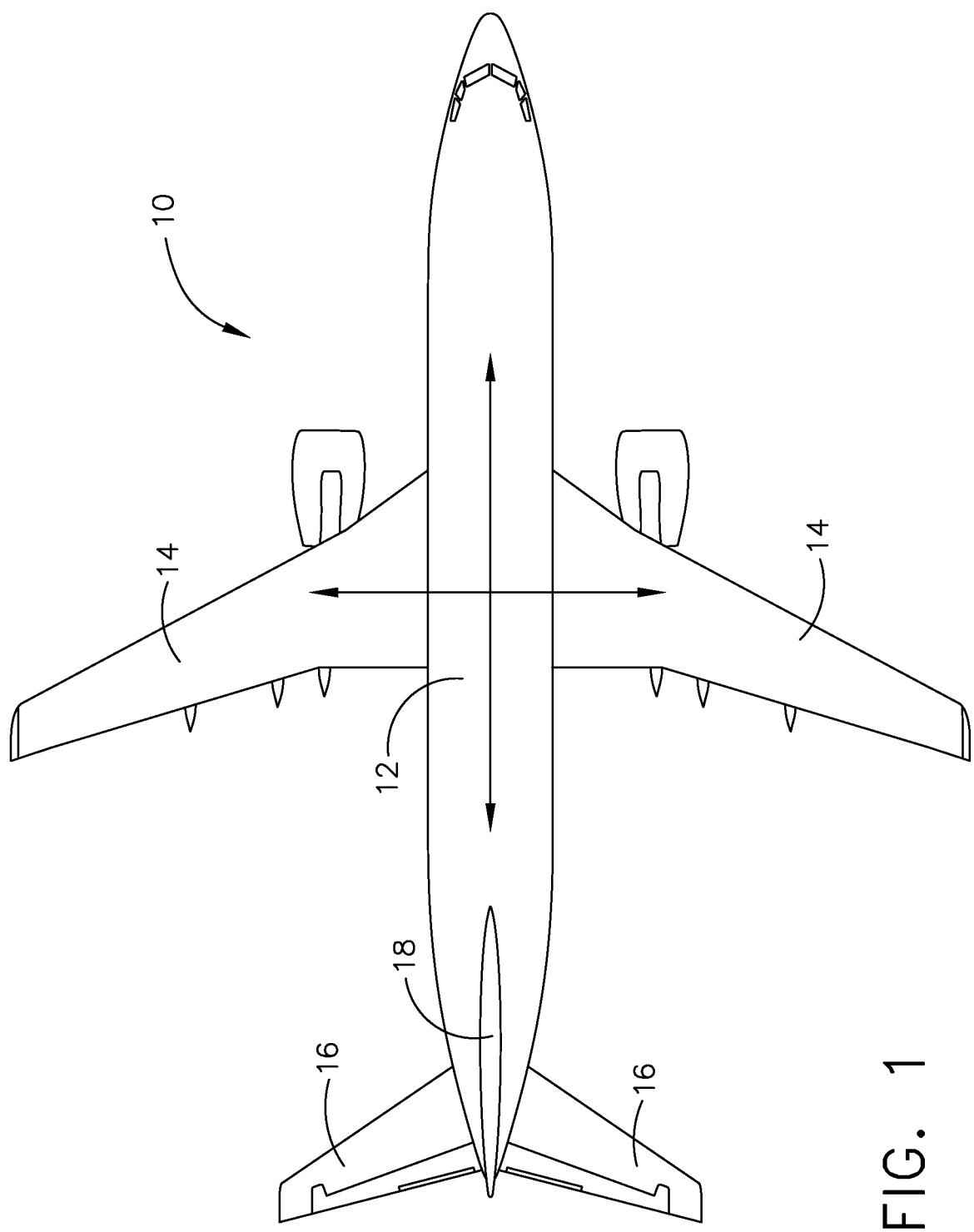
FIG. 1 is a top plan view of an aircraft.
Figure 2:
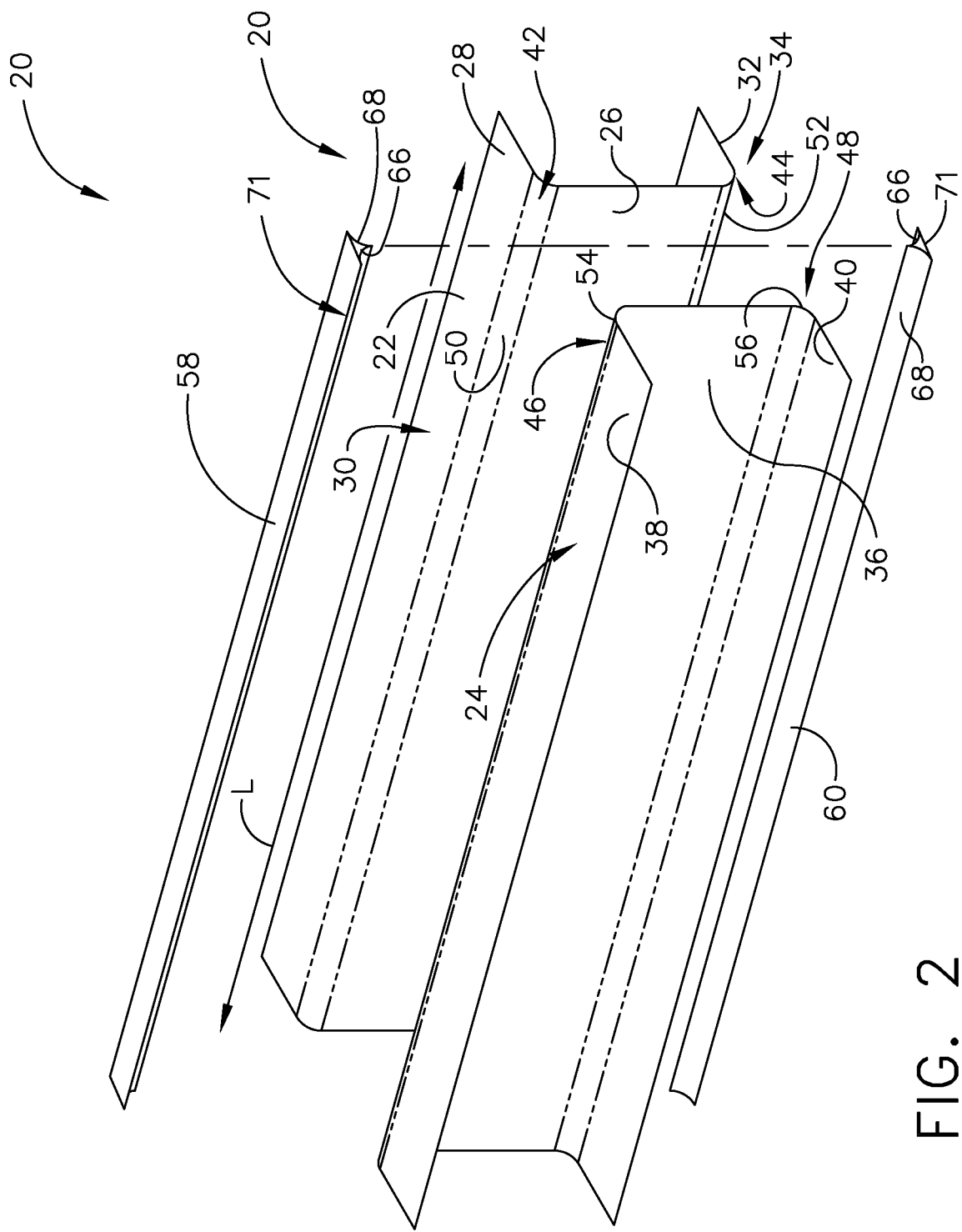
FIG. 2 is an exploded perspective view of a stringer with a first composite gap filler positioned extending along a first end of the stringer and a second composite gap filler positioned extending along an opposing second end of the stringer.
Figure 3:
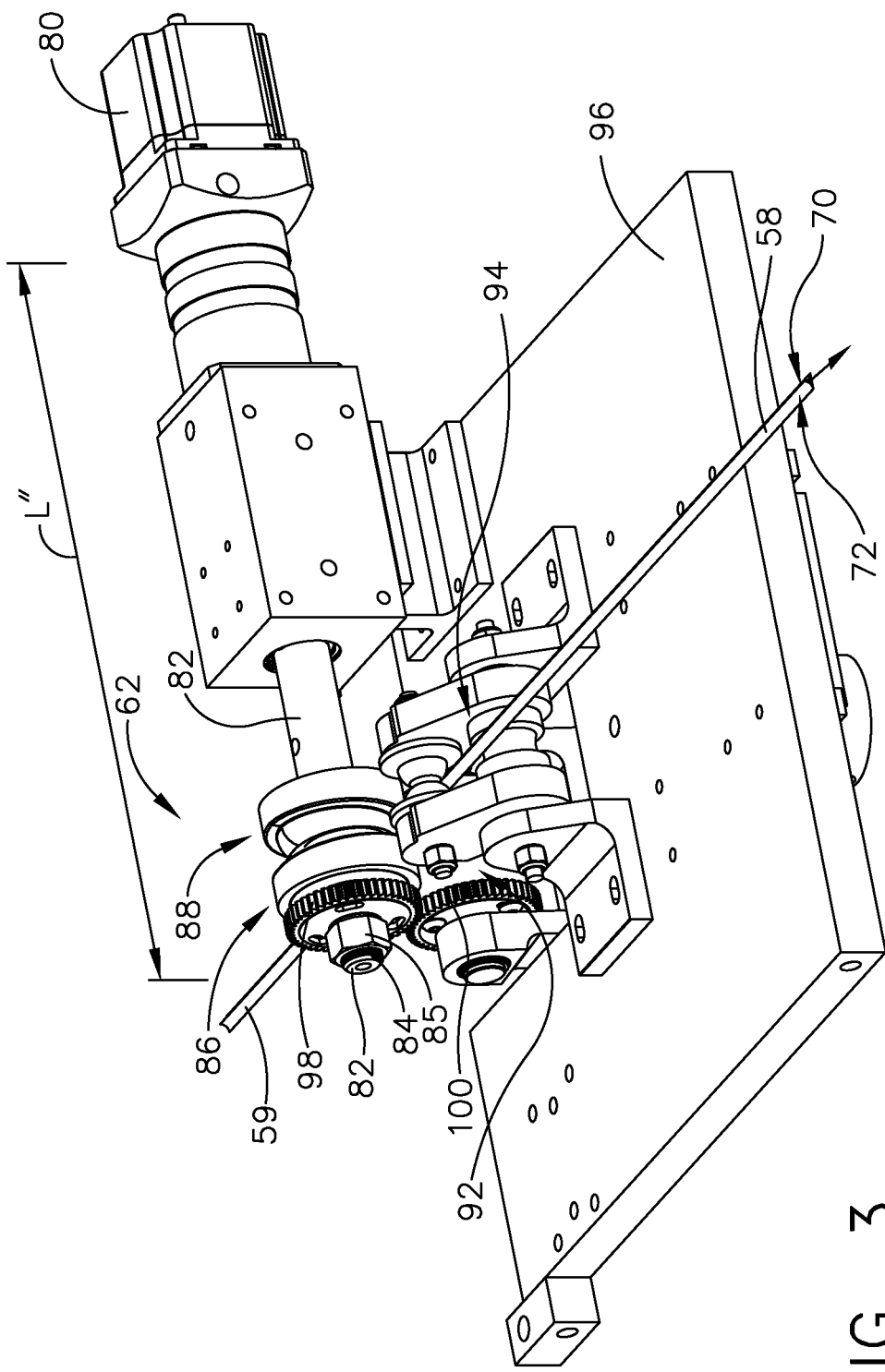
FIG. 3 is a perspective view of a die assembly for forming a composite gap filler.

In referring to FIGS. 1-3 stringers are reinforcement members fabricated to be secured to skin structures often used in construction of aircraft and other aerospace vehicles. Stringers provide additional strength to a skin structure thereby avoiding the need to add additional laminates to the skin structure which would add additional weight to the skin structure. Skin and stringer assemblies are used in fabrication of aircraft such, as for example, aircraft 10, as seen in FIG. 1. Portions of aircraft 10 are constructed with a reinforced skin structure utilizing stringers for example with respect to one or more of fuselage 12, wings 14, horizontal stabilizers or tail wings 16 and vertical stabilizer 18. Stringers can take on any number of configurations and sizes depending on the load demands and space availability with respect to the portion of aircraft 10 being constructed.

An example of a configuration for stringer 20 can be seen in FIG. 2 wherein stringer 20 is constructed of a pair of c-shaped channels including first and second c-shaped channels 22, 24. First c-shaped channel 22 has a first web portion 26 with a first flange 28 extending from first web portion 26 on first end 30 of stringer 20 and second flange 32 extending from first web portion 26 from second opposite end 34 of stringer 20. Second c-shaped channel 24 has second web portion 36 with first flange 38 extending from second web portion 36 on first end 30 of stringer 20 and second flange 40 extending from second web portion 36 on second opposite end 34 of stringer 20.

First flange 28 of first c-shaped channel 22 forms first corner 42 with first web portion 26 and second flange 32 of first c-shaped channel 22 forms second corner 44 with first web portion 26. Similarly, first flange 38 of second c-shaped channel 24 forms third corner 46 with second web portion 36 and second flange 40 of second c-shaped channel 24 forms fourth corner 48 with second web portion 36. Each of first and second corners 42, 44 have first curved surface 50 and second curved surface 52 respectively. Similarly each of third and fourth corners 46, 48 have third curved surface 54 and fourth curved surface 56 respectively.

With the first and second web portions 26, 36 positioned in abutting relationship with one another and secured together, stringer 20 is formed. First flange 28 and first flange 38 on first end 30 of stringer 20 are aligned with one another and extend in opposite directions from one another. As a result, first corner 42 and third corner 46 are positioned adjacent with one another with second curved surface 52 and fourth curved surface 56 positioned adjacent to one another. On second opposite end 34 of stringer 20, second flange 32 and second flange 40 are aligned with one another and extend in opposite directions from one another. As a result, second corner 44 and fourth corner 48 are positioned adjacent to one another with second curved surface 52 and fourth curved surface 56 positioned adjacent to one another.

With first end 30 of stringer 20 positioned against a skin structure (not shown) in FIG. 2, the skin structure and first and third curved surfaces 50, 54 on the first end 30 of stringer 20 form a three sided gap (not shown) which extends along length L of stringer 20. The skin structure forms a more planar side of the three sided gap which extends between the first and third curved surfaces 50, 54 forming the three sided gap. First composite gap filler 58 is provided to fill the three sided gap which extends along length L of first end 30 of stringer 20. With second opposite end 34 of stringer 20 having another skin structure (not shown) positioned in overlying relationship with the second opposite end 34 of stringer 20, the other skin structure and second curved surface 52 and fourth curved surface 56 on second opposite end 34 of stringer 20 also form a three sided gap (not shown) which extends along length L of second opposite end 34 of stringer 20 The other skin structure forms a more planar side of the three sided gap which extends between the second and fourth curved surfaces 52, 56 forming the three sided gap. Second composite gap filler 60 is provided to fill the three sided gap which extends along length L of stringer 20 on second opposite end 34.

First and second composite gap fillers 58, 60 are provided to be positioned within each gap formed on the first end 30 of stringer 20 and on the gap formed on the second opposite end 34, respectively. First and second composite gap fillers 58, 60, as seen in FIG. 2, are constructed of composite material as is the first and second c-shaped channels 22 and 24 in this example. First and second composite gap fillers 58, 60 are needed to provide an optimal fit within the gap on the first end 30 and the second opposite end 34, respectively, so as to provide stringer 20 optimal strength in providing support to the skin structure (not shown). The size of stringer 20 and the corresponding size of the gap along the first end 30 and second opposite end 34 of stringer 20 can change in size depending on the load demands being placed on stringer 20 at a particular location along stringer 20. Stringer 20 increases in size to support high load demands and the corresponding gap increases in size as well and as stringer 20 decreases in size to support lesser load demands the corresponding gap decreases in size. Where load demands remain constant, stringer 20 maintains a constant size and the corresponding gaps of first end 30 and second opposite end 34 of stringer 20 maintain a constant size and configuration. This is representatively seen with respect to stringer 20 in FIG. 2, wherein first and second composite gap fillers 58, 60 are provided having a constant size along length L of stringer 20 so as to accommodate and fill a constant sized gap along constant sized stringer 20.

Figure 4:
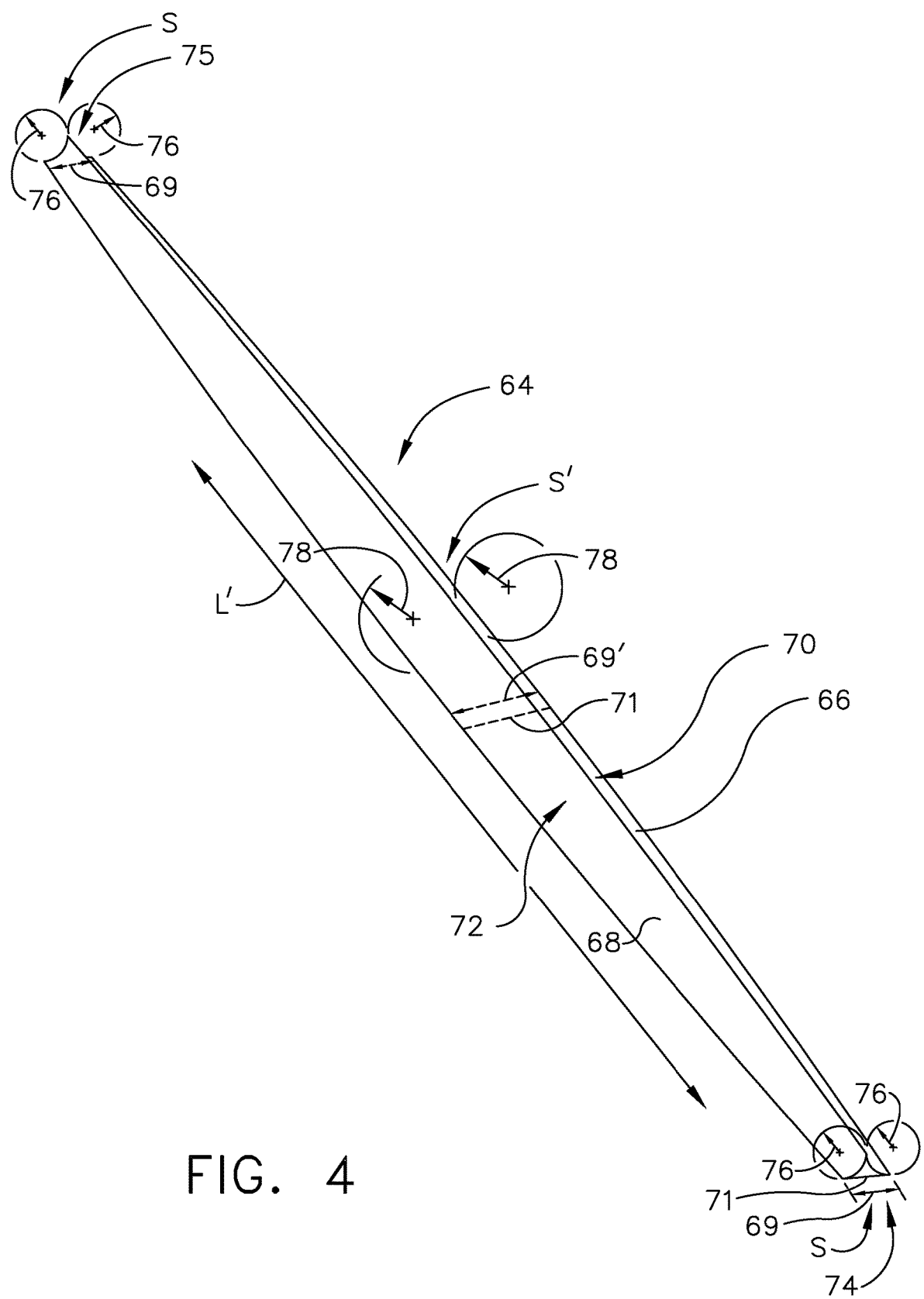
FIG. 4 is a perspective view of a composite gap filler formed by the die assembly of FIG. 3.

With size of stringer 20 changing along the length of stringer 20 so as to accommodate load demand, corresponding thickness of a composite of stringer 20 changes with more layers where greater strength is needed and less layers where less strength is needed. As a result, corresponding size and configuration of gaps are experienced along stringer 20 changes as defined by first end 30 of stringer 20 and skin structure (not shown) and by second opposite end 34 of stringer 20 and other skin structure (not shown). As a result, corresponding changes in size and configuration of composite gap filler is desired to be made such as representatively shown with respect to composite gap filler 64, as seen in FIG. 4 in order to optimally fill the gap and optimize the support strength provided by stringer 20 to the skin structure. Change in size and configuration of composite gap filler 64 along length L of stringer 20 is needed to optimize the fit of composite gap filler 64 within gaps defined by stringer 20 and skin structure (not shown) positioned in this example on first end 30 and second opposite end 34 of stringer 20 as the gap size and configuration changes. In order for composite gap filler 64 to accommodate changes to the gap as they arise along length L of first end 30 and second opposite end 34 of stringer 20, changes need to be made to the size and configuration of the composite gap filler 64, which includes to the radius of curvature of adjacent first and second adjacent curved surfaces 66, 68, which are symmetric, and to width dimension 69 of third side 71 of composite gap filler 64 along length L' of composite gap filler 64 as shown representatively in FIG. 4. Stringers 20 are generally constructed with smooth transitioned surfaces in changing size of stringer 20 and as a result composite gap fillers should have similarly constructed smooth transitioned surfaces in changing size and configuration of the composite gap filler so as to optimize fit within the gap and thereby optimize performance of stringer 20.

Die assembly 62, as shown in FIG. 3, provides for construction of composite gap filler from composite material 59 which can be constructed at a constant size as desired along length L, as representatively shown in FIG. 2 as first and second composite gap fillers 58, 60 and provides for construction of composite gap filler 64 which changes in size and configuration along length L' of composite gap filler 64, as shown representatively for example in FIG. 4. Die assembly 62 provides for production of composite gap filler which remains constant in size and maintains smooth surfaces and provides for production of smooth transitioned surfaces as size and configuration of gap filler changes, as seen for example, along length L' of composite gap filler 64, as needed.

Figure 5:
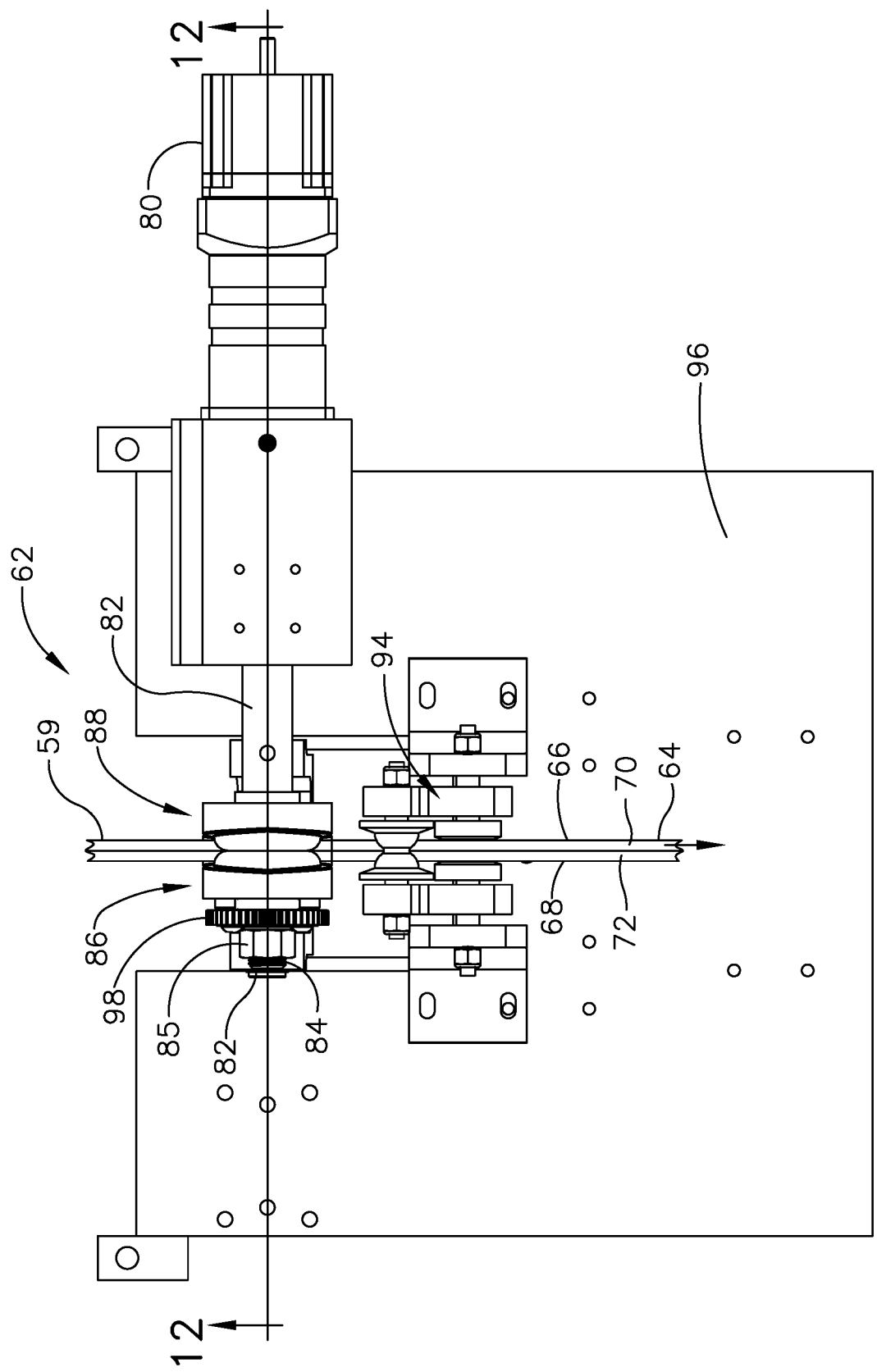
FIG. 5 is a top plan view of the die assembly of FIG. 4.

A representative example of transitioning in size and configuration of composite gap filler 64 is shown in FIG. 4 and is representatively fabricated from composite material 59 with die assembly 62 in FIG. 5. Composite gap filler 64, in this example, is fabricated with die assembly 62 and is transitioned along length L' of composite gap filler 64 to increase in size from, for example, from smaller first size S at first end 74 to a larger second size S'. Composite gap filler 64 is also transitioned along length L' to decrease in size, for example, back to smaller first size S at second end 75. With this example of transitioning in change of sizes along length L', composite gap filler 64 will correspondingly also smoothly transition in configuration of first and second adjacent curved surfaces 66, 68 from having first radius 76 at first end 74 and the first radius 76 increases along length L' to a greater dimension for second radius 78 where composite gap filler 64 is at larger second size S'. The radius is correspondingly transitioned, as seen in FIG. 4, to decrease as composite gap filler 64 extends along length L' from larger second size S' to second end 75 of composite gap filler 64, which has smaller size S, with in this example, having first radius 76. This smooth transition of size and radius of first and second adjacent curved surfaces 66, 68, which are symmetric, of composite gap filler 64 is accomplished, as will be further described, with rotation of first die 86 and second die 88, as seen in FIGS. 7-10 and 12-14, as composite material 59 is pulled through the first die 86 and second die 88, as seen representatively in FIG. 5.

Figure 11:
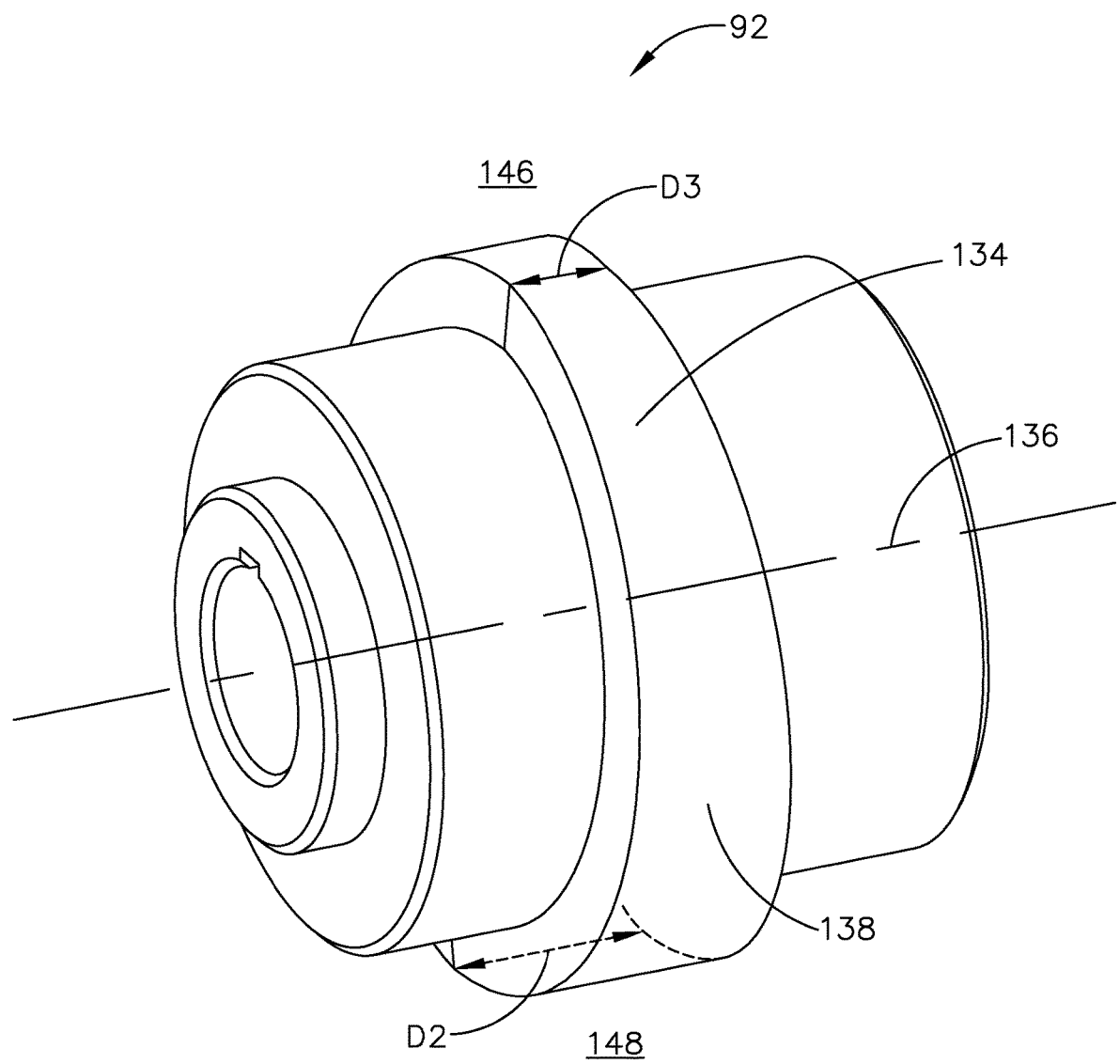
FIG. 11 is a perspective view of a third die of the die assembly of FIG. 3.

Similarly at the same time of change of radius along composite gap filler 64 first and second adjacent curved surfaces 66, 68, which are symmetric, third side 71 of composite gap filler 64, as seen in FIG. 4, transitions in this example from smaller first width dimension 69 at first end 74 and increases to larger second width dimension 69' of third side 71 associated with larger size S' of composite gap filler 64. Larger second width dimension 69' of third side 71 of composite gap filler 64, in this example, decreases in dimension along length L' and transitions to smaller first width dimension 69 at second end 75. This change in width dimension of third side 71, will be discussed further with respect to operation of third wall member 134 of third die 92, as seen in FIG. 11, of die assembly 62, wherein width dimension of third wall member 134 of third die 92 changes in width dimension accommodating the width dimension of third side 71 of composite gap filler 64 as needed so as to form third side 71 to extend to and between first and second adjacent curved surfaces 66, 68 of composite gap filler 64 along length of composite gap filler 64.

These transitions in size and configuration are formed with die assembly 62 without imparting abrupt changes in composite gap filler 64 configuration along length L' of gap filler 64. The smooth transition in configuration of size and configuration occurs, as mentioned, with composite material 59 being pulled through first die 86, second die 88 and third die 92 with first die 86, second die 88 and third die 92 being rotated. Providing smooth transitions in the changing of size and configuration of composite gap filler 64, which includes changing configuration of first and second adjacent curved surfaces 66, 68, which are symmetric, of composite gap filler 64 and changing width dimension of third side 71 of composite gap filler 64, provides optimization of fit of composite gap filler 64 along length L' within a gap which transitions in size and configuration formed along the length of the stringer 20 and skin structure assembly which is designed to confront at time varying load demands along the length of the stringer 20.

Figure 6:
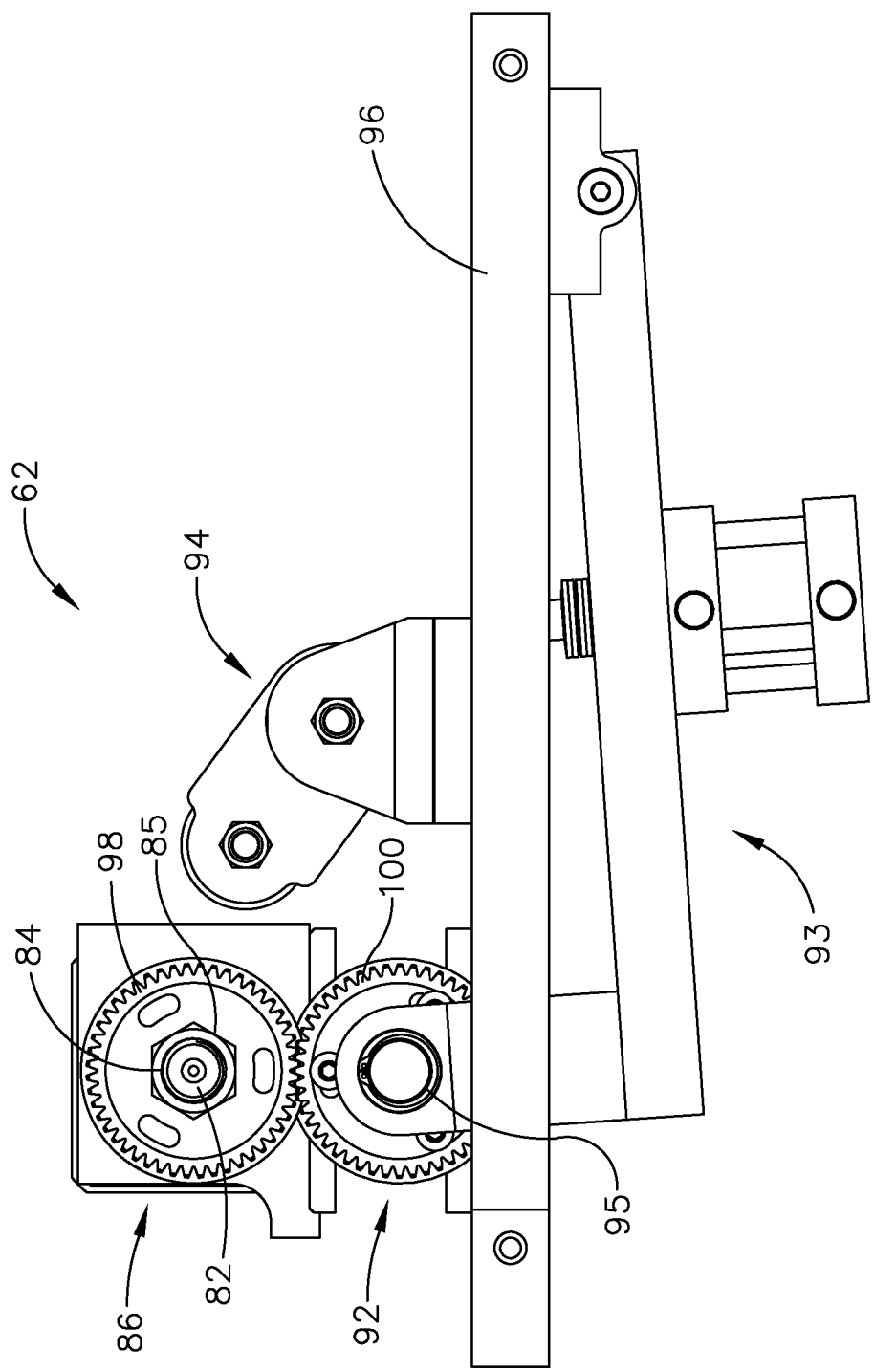
FIG. 6 is a side elevation view of the die assembly of FIG. 4.

In referring to FIGS. 3 and 5-6, die assembly 62 is shown which can for example impart first size S and first radius 76 to composite gap filler 64 as described above and shown in FIG. 4. Die assembly 62 can be constructed in a number of various constructions to accomplish imparting, as mentioned earlier, constant sized and configured composite gap fillers such as for example first and second composite gap fillers 58 and 60, with smooth first and second adjacent curved surfaces 66, 68 and smooth third side 71 as seen in FIG. 2. Die assembly 62 can impart smooth transitions in change of size and configuration to composite gap filler with change in radius of curvature to first and second adjacent curved surfaces 66, 68, which are symmetric, of first and second adjacent sides 70, 72 respectively in forming composite gap filler 64, as well as smooth transition in change of corresponding width dimension of third side 71.

Die assembly 62, in this example includes, motor 80 for imparting rotation as needed to drive shaft 82, which has a threaded end 84, as seen in FIGS. 3 and 5. First die 86 and second die 88 are secured to drive shaft 82, such that with rotation of drive shaft 82 by motor 80 both first die 86 and second die 88 rotate with drive shaft 82. This securement can be accomplished with various securement arrangements. In this example, first die 86 has keyway or notch 87, as seen in FIG. 7, second die 88 has keyway or notch 89, as seen in FIG. 8, and drive shaft 82 has a projection (not shown) which extends into keyways or notches 87 and 89. With rotation of drive shaft 82, the projection (not shown) positioned within keyways or notches 87 and 89 imparts rotation to first die 86 and second die 88. First die 86 and second die 88 are rotated as needed for transitioning size and configuration of the composite gap filler, with first die 86 and second die 88 rotating in abutting relationship with one another and with, in this example, a compression force applied to first die 86 and second die 88.

Figure 12:
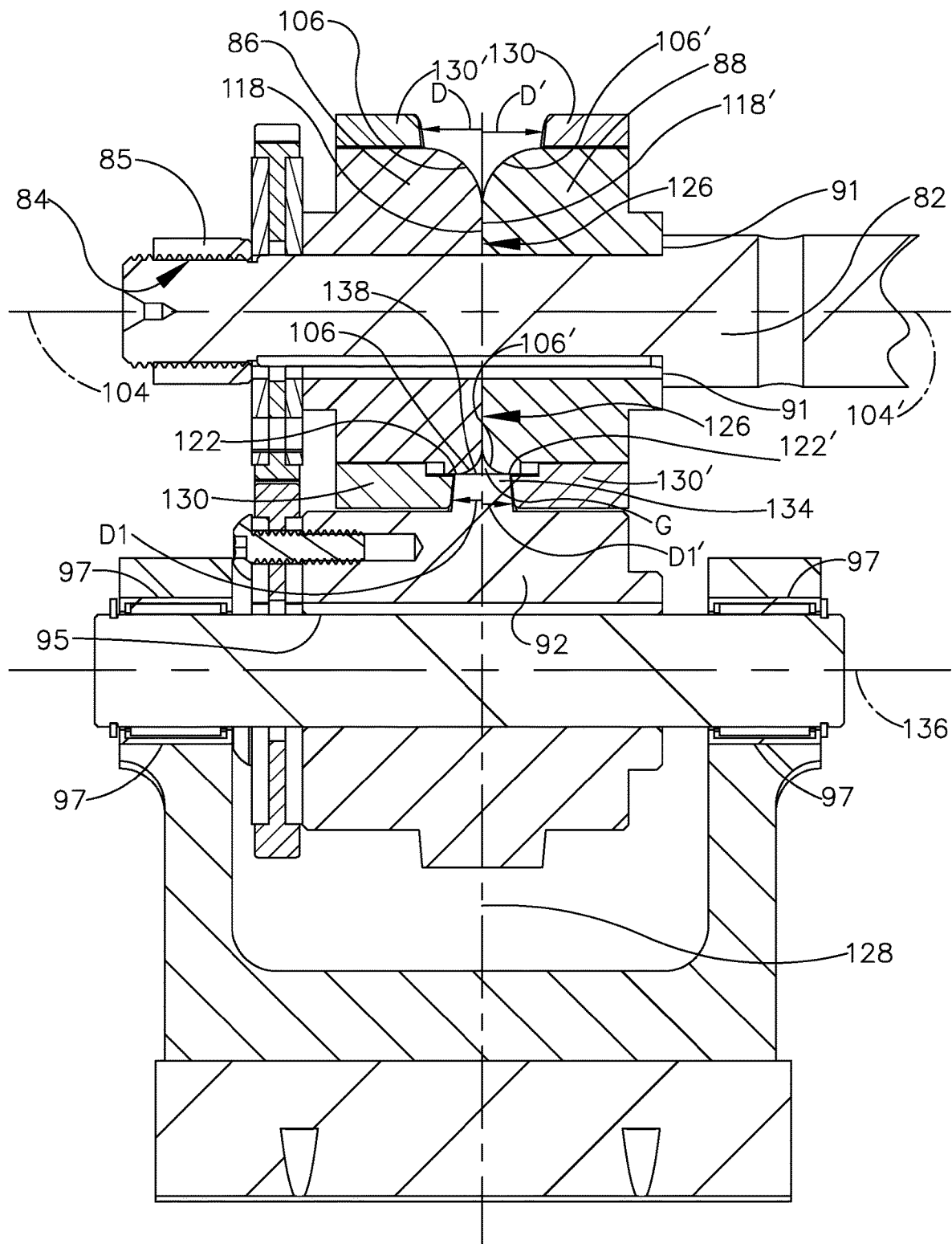
FIG. 12 is a cross section view of the die assembly along line 12-12 of FIG. 5.

First die 86 and second die 88 are compressed together with tightening of nut 85 positioned on threaded end 84 of drive shaft 82. First die 86 and second die 88 are compressed together with tightening of nut 85 resulting in compressing of first die 86 and second die 88 between nut 85 and wall 91 defined by, in this example, drive shaft 82 as seen in FIG. 12. With drive shaft 82 not rotating and with loosening of nut 85, first die 86 and second die 88 can be moved along drive shaft 82, as needed, with projection (not shown) positioned within notch 87 of first die 86 and notch 89 of second die 88.

Third die 92, is rotationally mounted to shaft 95, such that third die 92 rotates about shaft 95. Shaft 95 has bearing collar 97 secured to shaft 95 in two locations, in this example, spaced apart from one another as seen in FIG. 12. Bearing collar 97 includes bearings such as needle bearings (not shown), which permit third die 92 to be rotated about shaft 95. Bearing collar 97, as seen in FIG. 6, is mounted to piston assembly 93 which is, in turn, mounted to platform 96 so as to be able to rotate piston assembly 93 relative to platform 96. Piston assembly 93 can apply a force onto bearing collar 97 which results in the force being transmitted to third die 92 such that third die 92 is urged against first die 86 and second die 88, as seen in FIGS. 3 and 6, and discussed further herein. In addition, piston assembly 93 imparts force onto second gear 100 which is secured to third die 92. Piston assembly 93 urges second gear 100 toward first gear 98, which is secured to rotate with rotation of drive shaft 82. In urging second gear 100 toward first gear 98, first gear 98 and second gear 100 are intermeshed and such urging maintains first gear 98 and second gear 100 engaged with one another such that with rotation of drive shaft 82 first gear 98 rotates along with first die 86 and second die 88 and first gear 98 rotates second gear 100 which in turn rotates third die 92 about shaft 95. As a result of this arrangement, first die 86, second die 88 and third die 92 synchronously rotate together.

As long as composite gap fillers such as first and second composite gap fillers 58, 60 maintain a constant size and configuration along length L, as seen in FIG. 2, first die 86, second die 88 and third die 92 of die assembly 62 form a closed gap and stay in a static nonrotating position as composite material 59 is pulled through die assembly 62. First die 86 and second die 88 form first and second adjacent curved surfaces 66, 68, which are symmetric, having a constant and equal radius of curvature and third die 92 forms a closed gap with first die 86 and second die 88 and forms a flatter third side 71 of the composite gap filler such as first and second composite gap fillers 58, 60. Constant sized first composite gap filler 58, for example, exits die assembly 62, as seen in FIG. 3, and is pulled through composite gap filler guide assembly 94, which is mounted to platform 96 as is die assembly 62, as seen in FIG. 5.

Should a change in the size and configuration of composite gap filler 64, as seen representatively in FIG. 4, be needed, wherein the radius of curvature of first and second adjacent curved surfaces 66, 68, which are symmetric, are to be changed along with a corresponding width dimension of the third side 71 along length L' of composite gap filler 64, motor 80 is activated to rotate drive shaft 82 and at the same time pulling of composite material 59 through die assembly 62. With motor 80 activated and drive shaft 82 turning, first die 86 and second die 88, which are compressed together, turn with drive shaft 82. At the same time third die 92, which abuts against first die 86 and second die 88 and is urged against first die 86 and second die 88 by piston assembly 93, also turns with first die 86 and second die 88. Rotation of first die 86 and second die 88 impart a smooth transition of change of radius for first and second adjacent curved surfaces 66, 68, which are symmetric, of first and second adjacent sides 70, 72 respectively, and rotation of third die 92 at the same time, forms third side 71 of composite gap filler 64 with smooth transition in corresponding changes in width dimension which accommodates width dimension of third side 71 so as to form third side 71 to extend to and between first and second adjacent curved surfaces 66, 68 which are changing radius, as seen in composite gap filler 64 along length L' of FIG. 4. In either instance of production of composite gap filler with respect to the composite gap filler maintaining a constant size and configuration along the length of the composite gap filler or whether the composite gap filler changes in size and configuration along the length of the composite gap filler, the fabricator can elect to utilize application of heat to the first die 86, second die 88 and third die 92 or a lubricant to facilitate composite material 59 smoothly passing thought first die 86, second die 88 and third die 92 of die assembly 62.

As a result, a three sided composite gap filler 64 is formed with first and second adjacent curved surfaces 66, 68, which are symmetric, and third side 71, which extends to and between each of the first and second adjacent curved surfaces 66, 68. The rotation of first die 86 and second die 88 result in forming a constant change of radius of curvature of first and second adjacent curved surfaces 66, 68, which are symmetric, along length L' of composite gap filler 64 and at the same time with the rotation of third die 92, third die 92 forms third side 71 of composite gap filler 64 with smooth change of the width dimension of third side 71 so as to extend to and between first and second adjacent curved surfaces 66, 68 along length L' of composite gap filler 64. With size of composite gap filler 64 becoming smaller, radius reduces and width of third side reduces in width dimension and as composite gap filler 64 becoming larger, radius increases and third side increases in width dimension.

In referring to FIGS. 7-12, configurations of first die 86, second die 88 and third die 92 are shown. An example of first die 86 is shown in FIGS. 7 and 9, an example of second die 88 is shown in FIGS. 8 and 10 and an example of third die is shown in FIG. 11. The assembled configuration of first die 86, second die 88 and third die 92 for die assembly 62 is shown in FIG. 12.

First die 86 as shown in FIGS. 7 and 9 includes first portion 102 which extends along first central axis 104 and has first curved surface 106 having a radius which changes as first portion 102 extends about, as indicated by direction arrow 108, first central axis 104. First curved surface 106 has a minimum radius 110 with dimension L1 of radiuses of first curved surface 106 of first portion 102 and is positioned on first side 114 of first portion 102. First curved surface 106 has a maximum radius with dimension L2 for radiuses of first curved surface 106 of first portion 102 and is positioned on second opposing side 116 of first portion 102.

A rate of change of radiuses positioned between the minimum radius 110 having dimension L1 of first curved surface 106 of first portion 102 to maximum radius 112 having dimension L2 of first curved surface 106 of first portion 102 is linear. In this example, the radius changes at one thousandth of an inch (0.001 inch) per degree for one hundred and eighty degrees (180°). In this example, the minimum radius 110 increases in dimension to the maximum radius 112 in progressing through a first one hundred and eighty degrees (180°) about first central axis 104 at one thousandth of an inch (0.001 inch) per degree for one hundred and eighty degrees (180°). In completion of first curved surface 106 extending about first central axis 104 a second or remaining one hundred and eighty degrees (180°), the maximum radius 112 decreases in dimension to minimum radius 110 at the same rate of one thousandth of an inch (0.001 inch) per degree for one hundred and eighty degrees (180°). This change in radius with respect to first curved surface 106 of first portion 102 of first die 86 extends about first central axis 104.

First die 86 includes first planar surface portion 118 which extends from first end 120 of first curved surface 106 and second planar surface portion 122 which extends from second end 124 of first curved surface 106. First planar surface portion 118, which extends from first end 120 of first curved surface 106 extends tangentially with respect to first curved surface 106 and second planar surface portion 122, which extends from second end 124 of first curved surface 106 extends tangentially with respect to first curved surface 106.

Second die 88 as seen in FIGS. 8 and 10 has a similar configuration as first die 86. The similar parts and items identified in FIGS. 8 and 10 will be numbered the same number with an addition of an asterisk (') for the parts and items of second die 88. Second die 88 as shown in FIGS. 8 and 10 includes second portion 102' which extends along second central axis 104' and has second curved surface 106' having a radius which changes as second portion 102' extends about, as indicated by direction arrow 108', second central axis 104'. Second curved surface 106' has a minimum radius 110' having dimension L1' of radiuses of second curved surface 106' of second portion 102' and is positioned on first side 114' of second portion 102'. Second curved surface 106' has a maximum radius 112' having dimension L2' for of radiuses of second curved surface 106' of second portion 102' and is positioned on second opposing side 116' of second portion 102'.

A rate of change of radius positioned between the minimum radius 110' having dimension L1' of second curved surface 106' of second portion 102' to maximum radius 112' having dimension L2' of second curved surface 106' of second portion 102' is linear. In this example, the radius changes at one thousandth of an inch (0.001 inch) per degree for one hundred and eighty degrees (180°). In this example, the minimum radius 110' increases in dimension to the maximum radius 112' in progressing through a first one hundred and eighty degrees (180°) about first central axis 104 at one thousandth of an inch (0.001 inch) per degree for one hundred and eighty degrees (180°). In completion of second curved surface 106' extending about second central axis 104' a second or remaining one hundred and eighty degrees (180°), the maximum radius 112' decreases in dimension to minimum radius 110' at the same rate of one thousandth of an inch (0.001 inch) per degree for one hundred and eighty degrees (180°). This change in radius with respect to second curved surface 106' of second portion 102' of second 88 extends about second central axis 104'.

Second die 88 includes third planar surface portion 118' which extends from first end 120' of second curved surface 106' and fourth planar surface portion 122' which extends from second end 124' of second curved surface 106'. Third planar surface portion 118', which extends from first end 120' of second curved surface 106' extends tangentially with respect to second curved surface 106' and fourth planar surface portion 122', which extends from second end 124' of second curved surface 106' extends tangentially with respect to second curved surface 106'.

In referring to FIG. 12, first planar surface portion 118 of first die 86 and third planar surface portion 118' abut one another. As discussed earlier, for this example, compressive force is exerted onto first die 86 and second die 88 with tightening of nut 85 on threaded end 84 of drive shaft 82. With first planar surface portion 118 of first die 86 abutting third planar surface portion 118' of second die 88, fibers of composite material 59 are blocked from migrating into interface 126 of first planar surface portion 118 and third planar surface portion 118' and are retained in composite gap filler being formed by die assembly 62. First die 86 and second die 88 are positioned abutting one another such that the radius of curvature for first and second curved surfaces 106, 106' are the same length positioned across from one another and aligned with one another providing a symmetric formation on composite gap filler with first curved surface 106 and second curved surface 106'. For example, with first planar surface portion 118 and third planar surface portion 118' abutting one another maximum radius 112 of first curved surface 106 and maximum radius 112' of second curved surface 106' are aligned, as seen for example in FIG. 14 with first die 86 and second die 88 along with third die 92 forming gap G2. At the same time in which maximum radius 112 is aligned with maximum radius 112', minimum radius 110 of first curved surface 106 and minimum radius 110' of second curved surface 106' are aligned. As a result, at any location about the abutting first die 86 and second die 88, two adjacent sides of a gap formed by first die 86 and second die 88 by first curved surface 106 and second curved surface 106' have the same radius so as to form symmetric sides with respect to first and second adjacent curved surfaces 66, 68, which are symmetric, of composite gap filler formed with composite material 59 pulled through die assembly 62. Third die 92 has third wall member 134 with forming surface 138, as seen in FIG. 12 which forms closed gap G formed with third die 92 abutting first die 86 and second die 88, and forming surface 138 of third wall member 134 extends to and between symmetric adjacent first curved surface 106 and second curved surface 106' such that closed gap G is in a closed formation.

As seen in FIG. 12 first central axis 104 is coaxial with second central axis 104'. Interface 126 between the abutting of first planar surface portion 118 of first die 86 and third planar surface portion 118' of second die 88 defines plane 128 positioned transverse relative to coaxial first central axis 104 and second central axis 104'. First die 86 further includes first wall member 130. In this example is a separate component than first portion 102 however first wall member 130 can be a single construction with first portion 102. First wall member 130 extends in direction 132 away from first central axis 104, as seen in FIG. 9 and extends about first central axis 104 as seen in FIG. 7. Second die 88 further includes second wall member 130'. In this example, second wall member 130' is a separate component than second portion 102' however second wall member 130' can be a single construction with second portion 102'. Second wall member 130' extends in direction 132' away from second central axis 104', as seen in FIG. 10 and extends about second central axis 104' as seen in FIG. 8.

As seen in FIG. 12, distance D between first wall member 130 and plane 128 incurs a change in distance as first wall member 130 extends about first central axis 104 as seen with distance D1 between first wall member 130 and plane 128 being a smaller distance. In this example, distance D is associated with first curved surface 106 having a larger radius of curvature and distance D1 is associated with the first curved surface 106 having a smaller radius of curvature. The configuration with respect to second die 88 and second wall member 130' is similar. Second wall member 130' extends in direction 132' away from second central axis 104', as seen in FIG. 10 and extends about second central axis 104' as seen in FIG. 8. As seen in FIG. 12, distance D' between second wall member 130' and plane 128 incurs a change in distance as second wall member 130' extends about second central axis 104' as seen with distance D1' between second wall member 130' and plane 128 being a smaller distance. In this example, distance D' is associated with second curved surface 106' having a larger radius and distance D1' is associated with the second curved surface 106' having a smaller radius. The change in distance between first wall member 130 and second wall member 130' accommodates third wall member 134 of third die 92, described below, which changes in width dimension to pass between first wall member 130 and second wall member 130' in third wall member 134 abutting first die 86 and second die 130'.

Third die 92 as seen in FIG. 11, has third central axis 136 and defines third wall member 134 with forming surface 138, which extends about third central axis 136 and changes in width dimension as third wall member 134 extends about third central axis 136. With the first planar surface portion 118 and third planar surface portion 118' of first die 86 and second die 88, respectively abutting one another, as seen in FIG. 12, and with third wall member 134 abutting second planar surface portion 122 and the fourth planar surface portion 122' of first die 86 and second die 88, respectively, a closed gap G having shape S is formed, as seen in FIG. 12. Closed gap G is formed with first curved surface 106 and second curved surface 106' along with and forming surface 138 of third wall member 134 of third die 92.

In referring to FIG. 11, width dimension of third wall member 134, defined by third die 92, changes as third wall member 134 extends about third central axis 136. This change in width dimension of third wall member 134 corresponds to change in width dimension of third side 71 of composite gap filler as radius changes in first and second curved surfaces 106, 106' in forming first and second adjacent curved surfaces 66, 68, which are symmetric, of composite gap filler 64. The greater the radius of first and second curved surfaces 106, 106' the greater the width dimension of third wall member 134 and the smaller the radius of first and second curved surfaces 106, 106' the lesser the width dimension of the third wall member 134.

Figure 13:
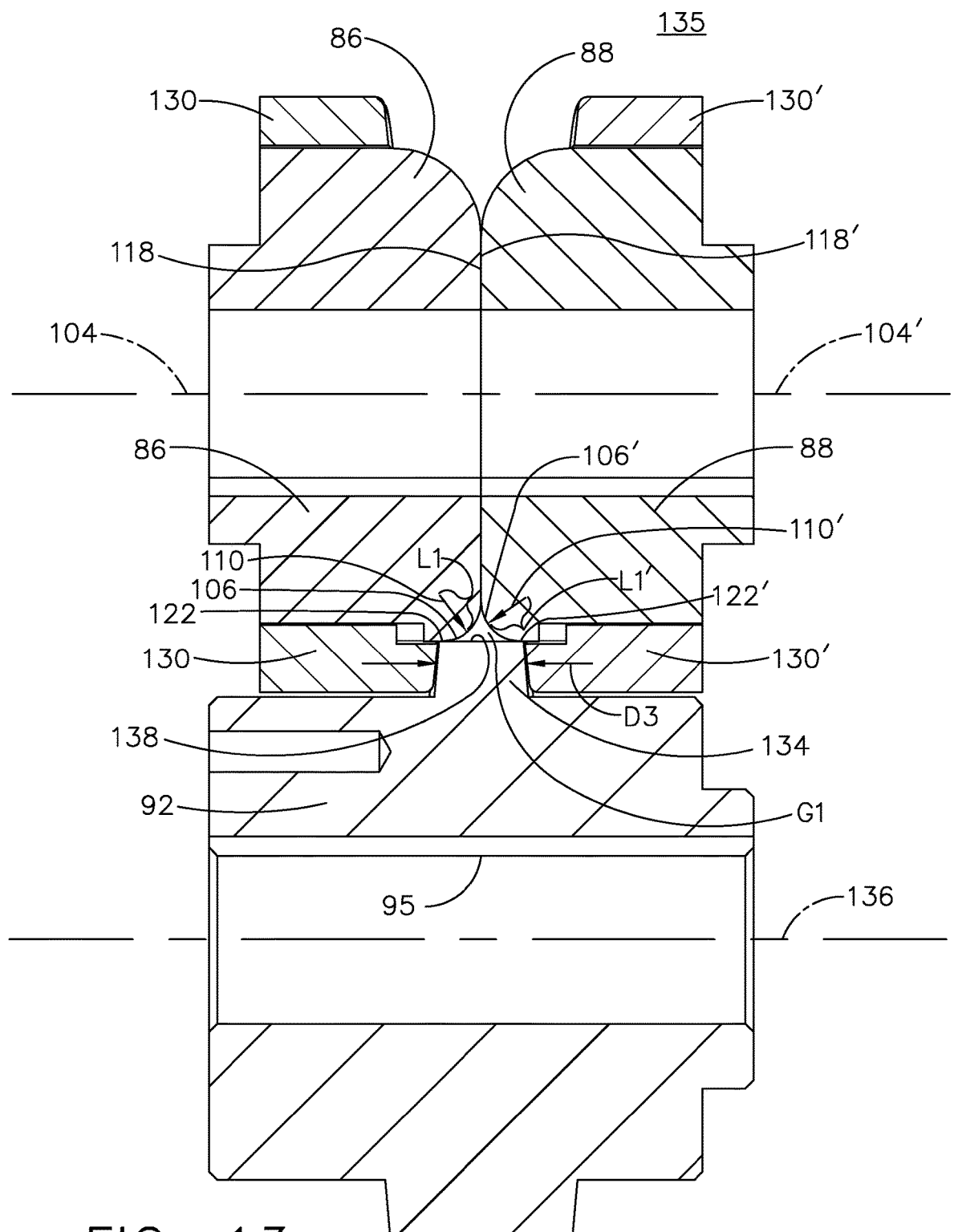
FIG. 13 is an enlarged partial view of the die assembly of FIG. 12 with first, second, and third dies in a first position.
Figure 14:
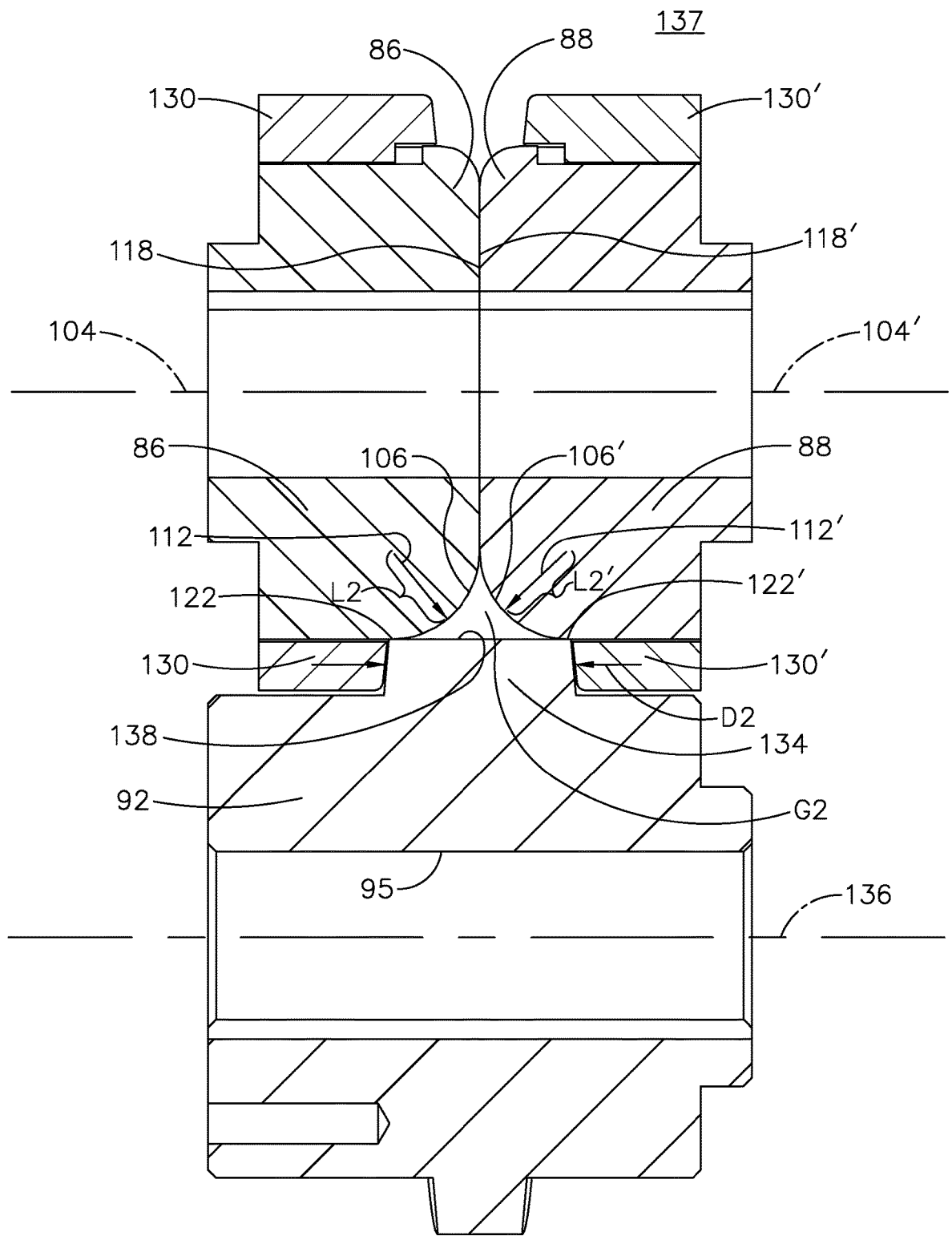
FIG. 14 is an enlarged partial view of the die assembly of FIG. 12 with first, second and third dies in a second position.

For an example, width dimension D3 is associated with the narrowest width dimension of third wall member 134 positioned on side 146 of third die 92, as seen in FIG. 11. Width dimension D3 will be positioned aligned with minimum radius 110 having dimension L1 and minimum radius 110' having dimension L1' of first and second curved surfaces 106, 106', respectively, as seen in FIG. 13 forming gap G1, with first die 86 and second die 88 positioned in first position 135. Forming surface 138 of narrowest width dimension D3 of third wall member 134 forms third side 71 of composite gap filler 64 and first and second adjacent curved surfaces 66, 68, which are symmetric, of composite gap filler 64 are formed from first and second curved surfaces 106, 106' with minimum radius 110 and minimum radius 110'. Width dimension D2 is associated with the largest width dimension of third wall member 134 positioned on side 148 of third die, as seen in FIG. 11. Width dimension D2 will be positioned aligned with maximum radius 112 having dimension L2 and maximum radius 112' having dimension L2' of first and second curved surfaces 106, 106' of first and second dies 86, 88, respectively as seen in FIG. 14 forming gap G2, with first die 86 and second die 88 positioned in second position 137. Forming surface 138 of widest width dimension D2 of third wall member 134 forms third side 71 of composite gap filler 64 and first and second adjacent curved surfaces 66, 68 which are symmetric, of composite gap filler 64 are formed from first and second curved surfaces 106, 106' with maximum radius 112 having dimension L2 and maximum radius 112' having radius L2'.

Width dimension of third wall member 134 changes in reducing in width dimension from largest width dimension D2 positioned on side 148 of third die 92 to smallest width dimension D3 positioned on side 146 of third die 92, as seen in FIG. 11. The width dimension changes from largest width dimension D2 to smallest width dimension D3 extends in this example one hundred and eighty degrees (180°) about third die 92 and the rate of change in this example is linear accommodating a linear rate of change of a change in third side 71 of composite gap filler 64 transitioning between changes in size of composite gap filler 64 and radiuses of curvature. The width dimension of third wall member 134 changes from smallest width dimension D3 to largest width dimension D2 extends about the remaining one hundred and eighty degrees (180°) about third die 92 with the rate of change in this example being linear accommodating a linear rate of change of a change in third side 71 of composite gap filler 64 transitioning between changes in size of composite gap filler 64 and radiuses.

Width dimension of third wall member 134 is smaller than a distance between the first wall member 130 and the second wall member 130' with third wall member 134 abutting second planar surface portion 122 and fourth planar surface portion 122' as seen in FIG. 12. Distance between first wall member 130 and second wall member 130', as discussed earlier, includes a total distance, for example, of distance D plus distance D' as seen in FIG. 12. This distance varies between first wall member 130 and second wall member 130' as first wall member 130 and second wall member 130' extend about first and second central axis 104, 104'. Width dimension of wall member 134 varies as wall member 134 extends about third central axis 136 and is smaller than the distance between first and second wall members 130, 130' such that third wall member 134 fits between first wall member 130 and second wall member 130' and abuts second planar surface portion 122 and fourth planar surface portion 122' to form a closed three sided gap G, as seen for example in FIG. 12, used to form three sided composite gap filler 64.

With third wall member 134 abutting second planar surface portion 122 and fourth planar surface portion 122' this configuration reduces fibers contained in composite material 59 which are being formed by die assembly 62, from being disturbed and migrating between third die 92 on the one hand and first die 86 and second die 88 on the other hand, at second planar surface portion 122 and fourth planar surface portion 122', respectively. This prevention of migration of fibers out of gap G prevents reduction of the fiber count of composite gap filler 64 being formed. As mentioned earlier piston assembly 93 applies an urging force of third die 92 against first die 86 and second die 88 providing for further secure closure of third wall member 134 against second and fourth planar surface portions 122, 122' and preventing reduction in fiber count for composite gap filler 64 being formed.

As earlier mentioned, first die 86 and second die 88 are secured to drive shaft 82 which extends along first central axis 104 and second central axis 104'. Drive shaft 82 has threaded end 84 and nut 85. Tightening of nut 85 secures first die 86 against second die 88 with first die 86 and the second die 88 positioned between nut 85 and wall 91 defined by drive shaft 82 as seen in FIG. 12. First die 86 and second die 88 are engaged to drive shaft 82 such that with rotation of drive shaft 82, first die 86 and second die 88 are rotated together. This is accomplished as earlier discussed with first die 86 and second die 88 having keyways or notches 87, 89 respectively engaging a projection (not shown) of drive shaft 82 such that first die 86 and second die 88 rotate with rotation of drive shaft 82. Third central axis 136 is positioned spaced apart from and is parallel to first central axis 104 and second central axis 104'.

First die 86, second die 88 and third die 92 are arranged to synchronously rotate with first gear 98 connected to drive shaft 82 and second gear 100 is secured to third die 92. First gear 98 and second gear 100 are intermeshed. With rotation of drive shaft 82 first die 86 and second die 88 rotate, first gear 98 rotates second gear 100 which in turn rotates third die 92. With this arrangement, first die 86, second die 88 and third die 92 rotate at the same time and can all rotate at a constant rate providing for smooth transition in changing of first and second adjacent curved surfaces 66, 68, which are symmetric, and smooth transition in changing of width dimension of third side 71 for composite gap filler 64 with a constant rate of pulling of composite material through die assembly 62.

As seen in FIGS. 12-14, with first planar surface portion 118 and third planar surface portion 118' abutting one another of first die 86 and second die 88, respectively, and with third wall member 134 abutting second planar surface portion 122 and fourth planar surface portion 122' of first and second dies 86, 88 respectively, three sided closed gaps G, G1 and, G2, as seen in FIGS. 12-14, respectively are formed. As mentioned above a constant size and configuration for composite gap filler can be formed with maintaining first die 86, second die 88 and third die 92 in a desired position forming a desired size and configuration of a closed gap and pulling of composite material 59 through the closed gap of die assembly 62 resulting in composite gap filler being formed with the constant desired size and configuration.

With a need to change the size and configuration of the composite gap filler along the length of the composite gap filler 64 with a smooth transition in change of size and configuration, composite material 59 is pulled through a closed gap of die assembly 62 at a constant rate with motor 80 rotating first die 86, second die 88 and third die 92 at a constant rate. A constant rate of change of the radius of curvature of first and second curved surfaces 106, 106' of first and second dies 86, 88 respectively, impart a constant rate of change of symmetric adjacent first and second adjacent curved surfaces 66, 68 along the length of composite gap filler 64 being formed. At the same time, with rotating of third die 92 at the same time, third die 92 imparts with forming surface 138 of third wall member 134 a constant rate of change of width dimension of the third side 71 of the composite gap filler 64 along the length of composite gap filler 64 such that the third side 71 of the composite gap filler extends to and between the two adjacent first and second adjacent curved surfaces 66, 68 which are symmetric.

Figure 15:
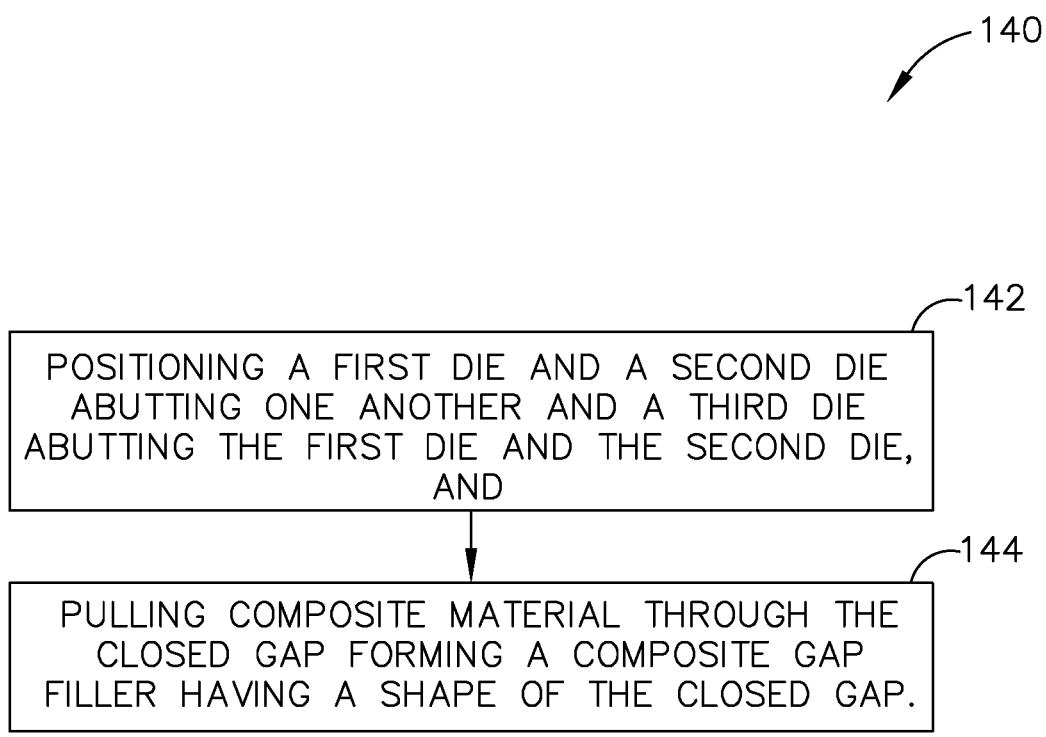
FIG. 15 is a flow chart of the method of forming a composite gap filler.

In referring to FIG. 15, method 140 for forming a composite gap filler, includes step 142 of positioning first die 86 and second die 88 abutting one another and a third die 92 abutting the first die 86 and second die 88, wherein first die 86 has first central axis 104, second die 88 has second central axis 104' and third die 92 has third central axis 136. First die 86 includes first portion 102 which extends along first central axis 104 and has first curved surface 106 having a radius which changes as first portion 102 extends about first central axis 104. First planar surface portion 118 extends from first end 120 of first curved surface 106 and second planar surface portion 122 extends from second end 124 of first curved surface 106. Second die 88 includes second portion 102' which extends along second central axis 104' and has second curved surface 106' having a radius which changes as second portion 102' extends about second central axis 104'. Third planar surface portion 118' which extends from first end 120' of second curved surface 106' and fourth planar surface portion 122' extends from second end 124' of second curved surface 106'. Third die 92 defines third wall member 134 which extends about third central axis 136 and changes in width dimension as third wall member 134 extends about third central axis 136, such that with first planar surface portion 118 and third planar surface portion 118' abutting one another and second planar surface portion 122 and fourth planar surface portion 122' abutting third wall member 134, a closed gap G is formed. Method 140 further includes step 144 of pulling of composite material 59 through the closed gap G forming composite gap filler having shape S of closed gap G, as seen for example in FIG. 12.

As mentioned earlier, minimum radius 110 of first curved surface 106 has a minimum dimension L1 with respect to radiuses of first curved surface 106 of first portion 102 positioned on a first side 114 of first portion 102 of first die 86 and a maximum radius 112 of first curved surface 106 has a maximum dimension L2 for radiuses of first curved surface 106 of first portion 102 positioned on second opposing side 116 of first portion 102. Minimum radius 110' of second curved surface 106' has a minimum dimension L1' with respect to radiuses of second curved surface 106' of the second portion 102' positioned on a first side 114' of second portion 102' of second die 88 and a maximum radius 112' of second curved surface 106' has a maximum dimension L2' with respect to radiuses of second curved surface 106' of second portion 102' positioned on second opposing side 116' of second portion 102'. A rate of change of radiuses positioned between minimum radius 110 of the first curved surface 106 of first portion 102 to maximum radius 112 of the first curved surface 106 of first portion 102 is linear. A rate of change of radiuses positioned between minimum radius 110' of second curved surface 106' of second portion 102' to maximum radius 112' of second curved surface 106' of second portion 102' is linear.

With first planar surface portion 118 and third planar surface portion 118' abutting one another, the maximum radius 112 of first curved surface 106 and the maximum radius 112' of the second curved surface 106' are aligned. Also, minimum radius 110 of first curved surface 106 and minimum radius 110' of second curved surface 106' are aligned.

Method 140 further includes rotating first die 86, second die 88 and third die 92 and changing the radius of first and second adjacent curved surfaces 66, 68, which are symmetric, along a length L' of composite gap filler 64 and changing width dimension of a third side 71 of composite gap filler 64 along length L' of composite gap filler 64.

Method 140 further including rotating in this example synchronously first die 86, second die 88 and third die 92 wherein first gear 98 is secured to drive shaft 82 to rotate with drive shaft 82 and with first die 86 and second die 88, which are secured to drive shaft 82. Second gear 100 is secured to third die 92, which is rotatably mounted to shaft 95 as described earlier. First gear 98 and second gear 100 are intermeshed with one another, such that with rotating drive shaft 82, first die 86, second die 88 and third die 92 rotate at a same time.

While various embodiments have been described above, this disclosure is not intended to be limited thereto. Variations can be made to the disclosed embodiments that are still within the scope of the appended claims.

What is claimed:

1. A die assembly for forming a composite gap filler, comprising:
   a first die having a first central axis wherein the first die comprises:
      a first portion which extends along the first central axis and has a first curved surface having a radius which changes as the first portion extends about the first central axis; and
      a first planar surface portion which extends from a first end of the first curved surface and a second planar surface portion which extends from a second end of the first curved surface;
   a second die has a second central axis wherein the second die comprises:
      a second portion which extends along the second central axis and has a second curved surface having a radius which changes as the second portion extends about the second central axis; and
      a third planar surface portion which extends from a first end of the second curved surface and a fourth planar surface portion which extends from a second end of the second curved surface; and
   a third die has a third central axis and defines a third wall member which extends about the third central axis and changes in width dimension as the third wall member extends about the third central axis, wherein with the first planar surface portion and the third planar surface portion abutting one another and with the third wall member abutting the second planar surface portion and the fourth planar surface portion, a closed gap is formed with the first die, second die, and third die to form the composite material gap filler.

2. The die assembly of claim 1, wherein:
   the first curved surface has a minimum radius for radiuses of the first curved surface of the first portion positioned on a first side of the first portion and has a maximum radius for radiuses of the first curved surface of the first portion positioned on a second opposing side of the first portion; and
   the second curved surface has a minimum radius for radiuses of the second curved surface of the second portion positioned on a first side of the second portion and has a maximum radius for radiuses of the second curved surface of the second portion positioned on a second opposing side of the second portion.

3. The die assembly of claim 2, wherein:
   a rate of change of radiuses positioned between the minimum radius of the first curved surface of the first portion to the maximum radius of the first curved surface of the first portion is linear; and
   a rate of change of radiuses positioned between the minimum radius of the second curved surface of the second portion to the maximum radius of the second curved surface of the second portion is linear.

4. The die assembly of claim 3, wherein with the first planar surface portion and the third planar surface portion abutting one another the maximum radius of the first curved surface and the maximum radius of the second curved surface are aligned and the minimum radius of the first curved surface and the minimum radius of the second curved surface are aligned.

5. The die assembly of claim 1, wherein the first central axis is coaxial with the second central axis.

6. The die assembly of claim 5, wherein an interface between the abutting of the first planar surface portion and the third planar surface portion defines a plane positioned transverse relative to coaxial first central axis and the second central axis.

7. The die assembly of claim 6, wherein:
   the first die further includes a first wall member which extends in a direction away from the first central axis and extends about the first central axis; and
   a distance between the first wall member and the plane incurs a change in the distance as the first wall member extends about the first central axis.

8. The die assembly of claim 7,
   the second die further includes a second wall member which extends in a direction away from the second central axis and extends about the second central axis; and
   a distance between the second wall member and the plane incurs a change in the distance as the second wall member extends about the second central axis.

9. The die assembly of claim 8, wherein a width dimension changes of a third wall member defined by the third die as the third wall member extends about the third central axis.

10. The die assembly of claim 9, wherein the width dimension of the third wall member is smaller than a distance between the first wall member and the second wall member with the third wall member abutting the second planar surface portion and the fourth planar surface portion.

11. The die assembly of claim 5, further includes a drive shaft which extends along the first central axis and the second central axis, wherein:
   the drive shaft has a threaded end and a nut, which secures the first die against the second die with the first die and the second die positioned between the nut and a wall defined by the drive shaft; and
   the first die and the second die are engaged to the drive shaft such that with rotation of the drive shaft, the first die and the second die are rotated together.

12. The die assembly of claim 11, wherein the third central axis is positioned spaced apart from the first central axis and the second central axis.

13. The die assembly of claim 12, wherein the third central axis extends parallel to the first central axis and the second central axis.

14. The die assembly of claim 13, further includes a first gear connected to the drive shaft and a second gear is secured to the third die, wherein:
   the first gear and the second gear are intermeshed; and
   with rotation of the drive shaft the first die and second die rotate, the first gear rotates, the second gear rotates and the third die rotates at a same time.

15. The die assembly of claim 1, wherein:
   the first planar surface portion which extends from the first end of the first curved surface extends tangentially with respect to the first curved surface and the second planar surface portion which extends from the second end of the first curved surface extends tangentially with respect to the first curved surface; and
   the third planar surface portion which extends from the first end of the second curved surface extends tangentially with respect to the second curved surface and the fourth planar surface portion which extends from the second end of the second curved surface extends tangentially with respect to the second curved surface.

16. A method for forming a composite gap filler, comprising the steps of:
positioning a first die and a second die abutting one another and a third die abutting the first die and the second die, wherein:
the first die has a first central axis, the second die has a second central axis and the third die has a third central axis;
the first die comprises:
a first portion which extends along the first central axis and has a first curved surface having a radius which changes as the first portion extends about the first central axis; and
a first planar surface portion which extends from a first end of the first curved surface and a second planar surface portion which extends from a second end of the first curved surface; and
the second die, comprises:
a second portion which extends along the second central axis and has a second curved surface having a radius which changes as the second portion extends about the second central axis; and
a third planar surface portion which extends from a first end of the second curved surface and a fourth planar surface portion which extends from a second end of the second curved surface; and
a third die defines a third wall member which extends about the third central axis and changes in width dimension as the third wall member extends about the third central axis, such that with the first planar surface portion and the third planar surface portion abutting one another and the second planar surface portion and the fourth planar surface portion abutting the third wall member, a closed gap is formed; and
pulling composite material through the closed gap forming a composite gap filler having a shape of the closed gap.

17. The method of forming a composite gap filler of claim 16, further includes:
a minimum radius of the first curved surface has a minimum dimension for radiuses of the first curved surface of the first portion positioned on a first side of the first portion of the first die and a maximum radius of the first curved surface has a maximum dimension for radiuses of the first curved surface of the first portion positioned on a second opposing side of the first portion;
a minimum radius of the second curved surface has a minimum dimension for radiuses of the second curved surface of the second portion positioned on a first side of the second portion of the second die and has a maximum radius of the second curved surface has a maximum dimension for radiuses of the second curved surface of the second portion positioned on a second opposing side of the second portion;
a rate of change of radiuses positioned between the minimum radius of the first curved surface of the first portion to maximum radius of the first curved surface of the first portion is linear; and
a rate of change of radiuses positioned between the minimum radius of the second curved surface of the second portion to the maximum radius of the second curved surface of the second portion is linear.

18. The method for forming a composite gap filler of claim 17, wherein with the first planar surface portion and the third planar surface portion abutting one another the maximum radius of the first curved surface and the maximum radius of the second curved surface are aligned and the minimum radius of the first curved surface and the minimum radius of the second curved surface are aligned.

19. The method for forming a composite gap filler of claim 16, further including rotating the first die, the second die and the third die and changing the radius of adjacent first and second curved surfaces which are symmetric along a length of the composite gap filler and changing width dimension of a third side of the composite gap filler along the length of the composite gap filler.

20. The method for forming a composite gap filler of claim 19, further including rotating synchronously the first die, the second die and the third die wherein:
a first gear is secured to a drive shaft to rotate with a drive shaft and with the first die and second die which are secured to the drive shaft;
a second gear is secured to the third die, which is rotatably mounted to a shaft; and
the first and second gears are intermeshed with one another, such that with rotating the drive shaft, the first die, the second die and the third die rotate at a same time.

* * * * *

UNITED STATES PATENT AND TRADEMARK OFFICE
CERTIFICATE OF CORRECTION

PATENT NO. : 11,254,074 B2
APPLICATION NO. : 16/445537
DATED : February 22, 2022
INVENTOR(S) : Paul Reed Stone et al.

It is certified that error appears in the above-identified patent and that said Letters Patent is hereby corrected as shown below:

On the Title Page

At item (57), Line 5, "die" should be -- die having --.

In the Claims

At Column 18, Line 16, "claim 7," should be -- claim 7, wherein: --.

At Column 19, Line 19, "die," should be -- die --.

At Column 19, Line 28, "a third die" should be -- the third die --.

At Column 19, Line 39, "method of" should be -- method for --.

Signed and Sealed this
Eighteenth Day of October, 2022

Katherine Kelly Vidal
*Director of the United States Patent and Trademark Office*